United States Patent
Fujita et al.

(10) Patent No.: US 6,806,975 B1
(45) Date of Patent: *Oct. 19, 2004

(54) PRINTING APPARATUS, SYSTEM, AND METHOD WITH AN ERROR SEARCH FUNCTION

(75) Inventors: Miyuki Fujita, Tokyo (JP); Hisashi Ishikawa, Yokohama (JP); Hiroshi Tajika, Yokohama (JP); Yuji Konno, Kawasaki (JP); Hiroo Inoue, Kawasaki (JP); Kenji Takahashi, Kawasaki (JP); Norihiro Kawatoko, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,977

(22) Filed: Feb. 12, 1998

(30) Foreign Application Priority Data

Feb. 14, 1997 (JP) .............................................. 9-030536

(51) Int. Cl.$^7$ ............................................. G06F 15/00
(52) U.S. Cl. ..................... 358/1.14; 358/1.15; 358/296; 358/302; 348/207.2
(58) Field of Search ................................. 395/113, 114, 395/115; 358/1.1–1.9, 1.11–1.18, 296, 302; 396/281–300, 544; 400/74, 703; 348/207.2

(56) References Cited

U.S. PATENT DOCUMENTS

| | | | | |
|---|---|---|---|---|
| 4,745,602 A | * | 5/1988 | Morrell | 714/2 |
| 5,111,302 A | * | 5/1992 | Chan et al. | 358/298 |
| 5,446,557 A | * | 8/1995 | Haze | 358/444 |
| 5,541,656 A | * | 7/1996 | Kare et al. | 348/334 |
| 5,541,840 A | * | 7/1996 | Gurne et al. | 701/33 |
| 5,546,164 A | * | 8/1996 | Hayashi et al. | 399/8 |
| 5,552,824 A | * | 9/1996 | DeAngelis et al. | 348/157 |
| 5,577,201 A | * | 11/1996 | Chan et al. | 714/57 |
| 5,611,046 A | * | 3/1997 | Russell et al. | 395/115 |
| 5,620,264 A | * | 4/1997 | Kagita | 400/74 |
| 5,625,757 A | * | 4/1997 | Kageyama et al. | 395/113 |
| 5,666,186 A | * | 9/1997 | Meyerhoefer et al. | 396/281 |
| 5,916,287 A | * | 6/1999 | Arjomand et al. | 701/29 |
| 5,936,609 A | * | 8/1999 | Matsuoka et al. | 345/156 |

FOREIGN PATENT DOCUMENTS

JP          62-97874          5/1987

* cited by examiner

*Primary Examiner*—King Y. Poon
(74) *Attorney, Agent, or Firm*—Fitzpatrick, Cella, Harper and Scinto

(57) ABSTRACT

Simple manual management and easy use are aimed for a system having a printer and an external apparatus such as a digital camera connectable thereto. This aim can be achieved by storing the contents of a manual, an error countermeasure corresponding to an error code and the like respectively of the external apparatus in a memory of the printer or external apparatus in the form of text and by printing out a necessary portion of the contents stored in the memory when necessary such as when a user requests and when an error is detected.

20 Claims, 22 Drawing Sheets

FIG. 5

| PRINTER OPERATION MANUAL |
|---|
| DIGITAL CAMERA OPERATION MANUAL |
| DATA COMMUNICATION MANUAL |
| PRINTER ERROR CODE 00 |
| PRINTER ERROR CODE 01 |
| PRINTER ERROR CODE 02 |
| ⋮ |
| PRINTER ERROR CODE nm |
| DIGITAL CAMERA ERROR CODE 00 |
| DIGITAL CAMERA ERROR CODE 01 |
| DIGITAL CAMERA ERROR CODE 02 |
| ⋮ |
| DIGITAL CAMERA ERROR CODE nm |

PRINTING APPARATUS, SYSTEM, AND METHOD WITH AN ERROR SEARCH FUNCTION

BACKGROUND OF THE INVENTION

1. Field of the Invention

The present invention relates to a printing apparatus directly connected to an image input apparatus, printing system and printing method.

2. Related Background Art

Various information processing apparatuses, communications apparatuses, and printing apparatuses are prevailing as multimedia has been recently developed rapidly, and these apparatuses are complicatedly interconnected as a network system. Of these apparatuses, printing apparatuses in particular are required to have a communications function with a plurality type of apparatuses in order to form images requested by these apparatuses. In spite of these circumstances, apparatuses are manufactured and sold independently by different makers so that it is necessary to provide a document explaining a use method of each apparatus. A user is required to read and understand the contents of the manual of each apparatus in order to use the network system freely and easily.

Various communications types can be realized now by various apparatuses of different makers by using the standard interface. Under such conditions, a large volume of manuals is used in the network system. A user is therefore required to understand and manage several manuals. A large amount of labor has been imposed upon each user particularly when an error occurs, because the user is not easy to locate the error immediately so that the user opens a manual of each apparatus and searches an error code in the manual.

SUMMARY OF THE INVENTION

It is an object of the present invention to solve the above problem and provide a printing apparatus, a printing system and a printing method capable of making it easy for a user to understand the contents of an operation manual or an error countermeasure of an image input apparatus connected to a printing apparatus, without opening and reading a real manual.

In order to achieve the above object, the present invention provides a printing apparatus to be connected to an image input apparatus, comprising: reception means for receiving an error code from the image input apparatus; search means for searching information containing error contents and an error countermeasure corresponding to the error code received by the reception means; and print means for printing the information containing the error contents and the error countermeasure searched by the search means.

A printing apparatus of the invention to be connected to an image input apparatus, comprises: reception means for receiving information containing an operation procedure of the image input apparatus from the image input apparatus; and print means for printing the information received by the reception means.

A printing system of the invention comprises: a printing apparatus to be connected to an image input apparatus, comprising: reception means for receiving an error code from the image input apparatus; search means for searching information containing error contents and an error countermeasure corresponding to the error code received by the reception means; and print means for printing the information containing the error contents and the error countermeasure searched by the search means, wherein the image input means transmits the error code to the printing apparatus when an error occurs.

A printing system of this invention comprises: a printing apparatus to be connected to an image input apparatus, comprising: reception means for receiving information containing an operation procedure of the image input apparatus from the image input apparatus; and print means for printing the information received by the reception means, wherein the image input apparatus transmits information containing error contents and an error countermeasure to the printing apparatus if an error occurs.

A printing method for a printing apparatus to be connected to an image input apparatus, the method comprises: a reception step of receiving an error code from the image input apparatus; a search step of searching information containing error contents and an error countermeasure corresponding to the error code received at the reception step; and a print step of printing the information containing the error contents and the error countermeasure searched at the search step.

A printing method of this invention for a printing apparatus to be connected to an image input apparatus, the method comprises: a reception step of receiving information containing an operation procedure of the image input apparatus from the image input apparatus; and a print step of printing the information received at the reception step.

BRIEF DESCRIPTION OF THE DRAWINGS

FIG. 5 is a block diagram showing the contents of a ROM according to the invention.

DETAILED DESCRIPTION OF THE PREFERRED EMBODIMENTS

First Embodiment

A first embodiment of the invention will be described.

Figure 1:
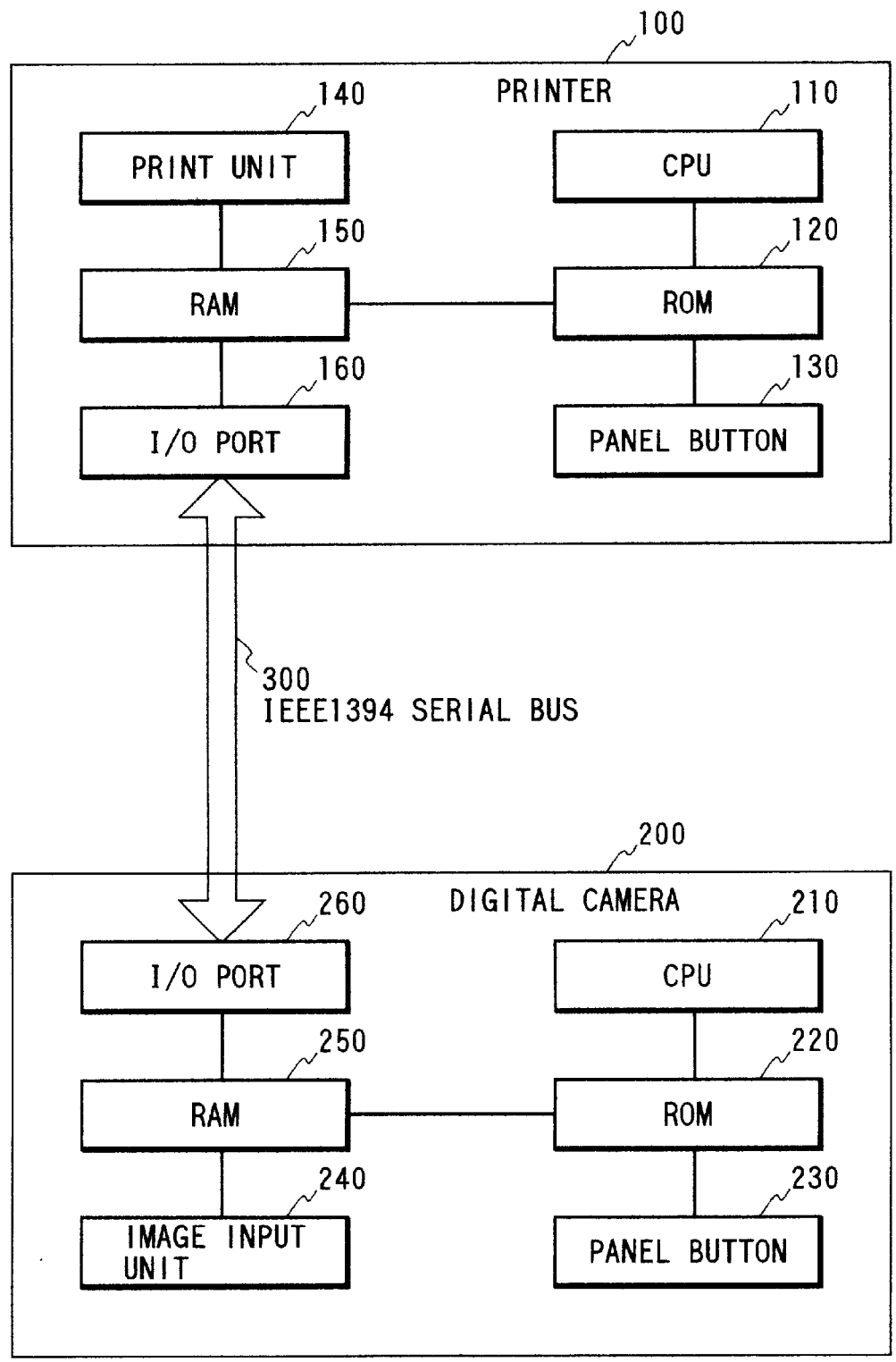
FIG. 1 is a block diagram of a system of this invention.

FIG. 1 is a diagram showing the structure of a printing apparatus such as an ink jet printer and an image input apparatus such as a digital camera.

A printer 100 is constituted of a CPU 110, a ROM 120 for storing various programs, font data and the like, a panel button 130, a print unit 140, a RAM 150 and an input/output (I/O) port 160. CPU 110 executes each program stored in ROM 120, and the processed results are stored in RAM 150 when necessary. The panel button 130 is used for providing an interface function with a user, such as a process execution instruction and an instruction content display. The print unit 140 prints data stored in RAM 150 under the control of a program stored in ROM 120. An I/O port 160 is a physical interface with an external image input apparatus and performs a transmission/reception process of commands and image data under the control of a communications control program stored in ROM 120.

A digital camera 200 is constituted of a CPU 210, a ROM 220, a panel button 230, an image input unit 240, a RAM 250, and an I/O port 260. CPU 210 executes each program stored in ROM 220, and the processed results are stored in RAM 250 when necessary. RAM 250 has an image input memory and an image data memory. Image data in the image data memory is subjected to a conversion process by a resolution conversion program stored in ROM 220 and output to the image input memory used as a working buffer. The panel button 230 is used for providing a user with an interface function, such as a process execution instruction and an instruction content display. The image input unit 240 reads image data from the image input memory of RAM 250 under the control of a program stored in ROM 220, and stores it in the image data memory. An I/O port 260 is a physical interface with an external printer and performs a transmission/reception process of commands and image data under the control of a communications control program stored in ROM 220.

The printer 100 and digital camera 200 are interconnected, for example, by an IEEE 1394 serial bus 300, the connectors of the serial bus being connected to the I/O ports 160 and 260. The IEEE 1394 serial bus will be later described. This communications cable may be replaced by an RS-232C or a wireless means of infrared such as IrDA, by changing the I/O ports to compatible ports. In such a case, the functions similar to the invention can also be realized.

An operation manual of the printer 100, an operation manual of the digital camera 200, and a printing method of printing data of the digital camera by the printer 100 are all stored in ROM 120 of the printer 100 in the form of text. These text contents can be printed out always if the power source of the printer 100 is on, unless the print operation or communications operation is not being performed.

Figure 2:
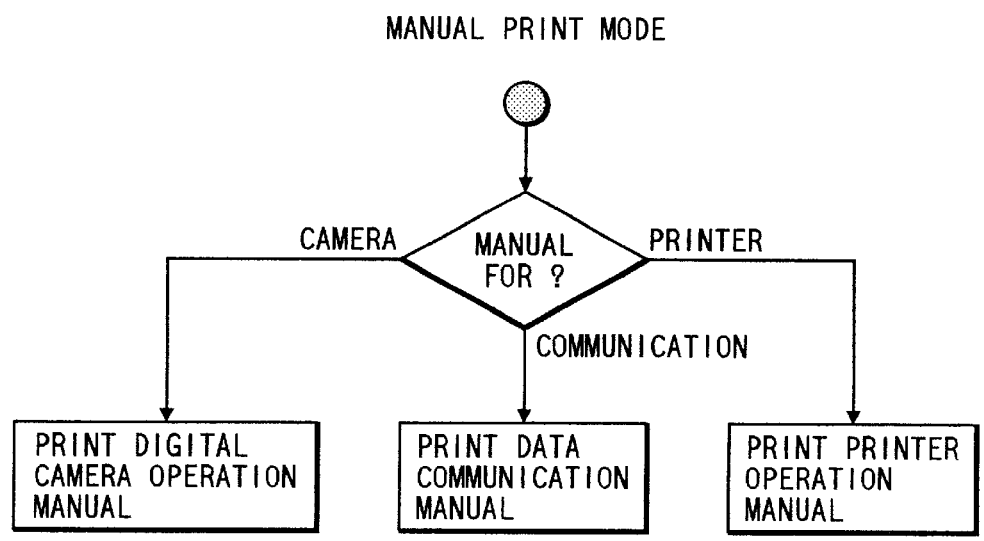
FIG. 2 is a flow chart illustrating a manual print mode of the invention.

Next, with reference to the block diagram of FIG. 2, a manual print mode will be described. A user confirms that the power source of the printer is on, and enters an instruction from the panel of the printer to start a manual print mode. The user selects one of three modes shown in FIG. 2. When one mode is selected, the printer 100 automatically prints out the manual corresponding to the selected mode in the form of text, the manual including an operation manual, apparatus specifications, types of expendables and the like. Since the printer of this embodiment stores all manuals in its memory, all the manuals corresponding to the three modes can be printed out even if the cable 300 is not connected.

Next, an error countermeasure to be performed when an error in data communications between the printer and a destination occurs will be described. It is assumed that an error occurs from some reason during printing or during data communications with the digital camera. If the reason of the error belongs to the printer, an error code is displayed on the panel of the printer. If the printer can still print out, this error code may be printed out.

If the reason of the error does not belong to the printer and communications with the digital camera is impossible, a connection error is displayed or printed out to notify the user of such an effect. If the reason of the error belongs to the digital camera although communications with the digital camera is possible, an error code of the digital camera is transmitted to the printer via the communications cable. The printer accesses its ROM by using the transmitted error code as a search key to read the text of the error contents and error countermeasure and print them out automatically or in response to a user selection.

Figure 3:
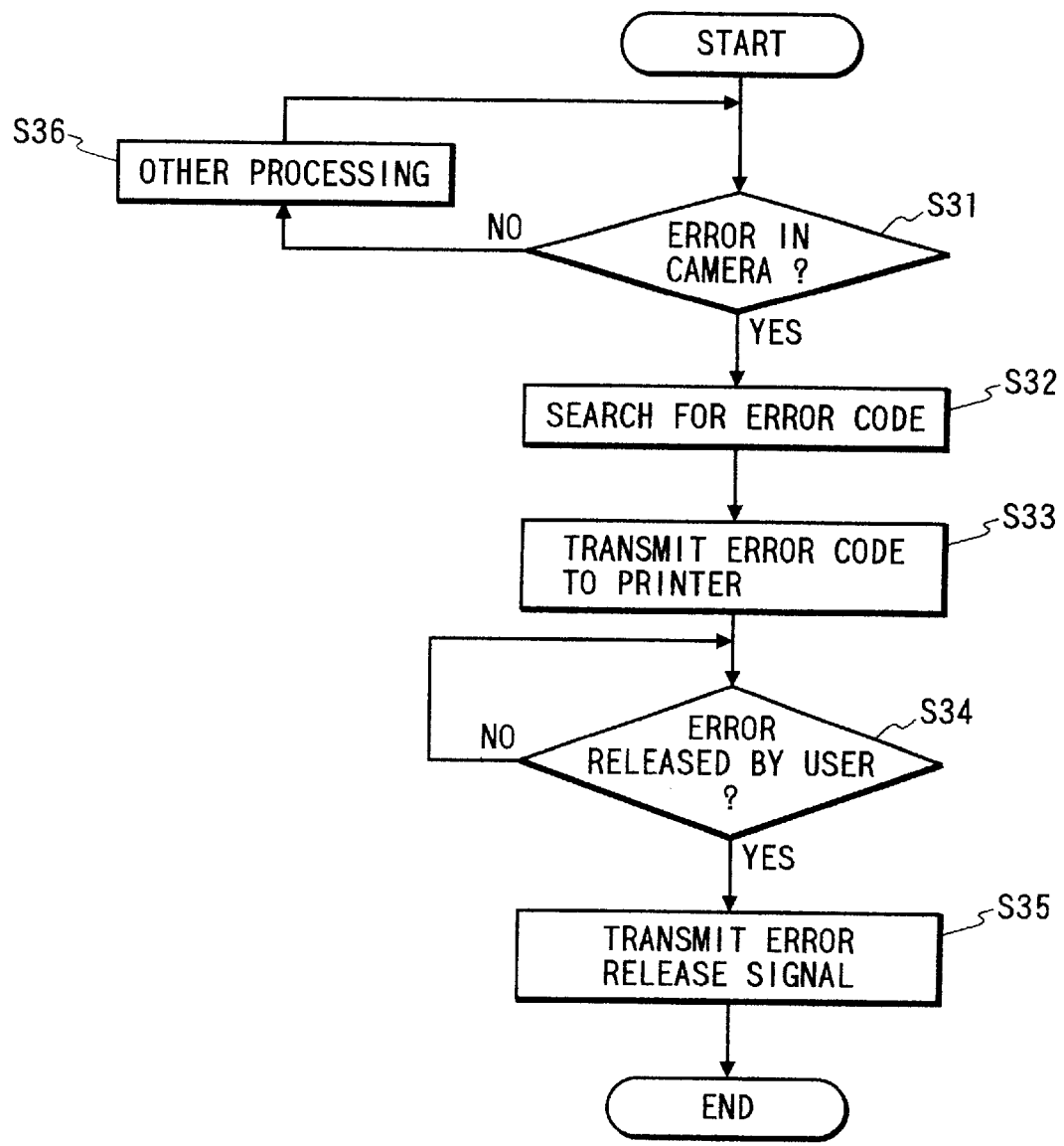
FIG. 3 is a flow chart illustrating a process to be executed by a digital camera of this invention.

Next, the process to be executed by the digital camera 200 will be described with reference to the flow chart of FIG. 3, the process being executed in accordance with a program stored in ROM 220 of the digital camera 200.

At Step S31 it is checked whether an error has occurred at the digital camera. If it is judged at Step S31 that an error has occurred, the flow advances to Step S32 whereat an error code corresponding to the error is searched, and at Step S33 the error code searched at Step S32 is transmitted to the printer 100.

At Step S34 it is checked whether the error was removed by a user. If removed, at step S35 an error removal signal is transmitted.

If it is judged at Step S31 that an error has not occurred, another process (such as an image input process) is performed at Step S36.

Figure 4:
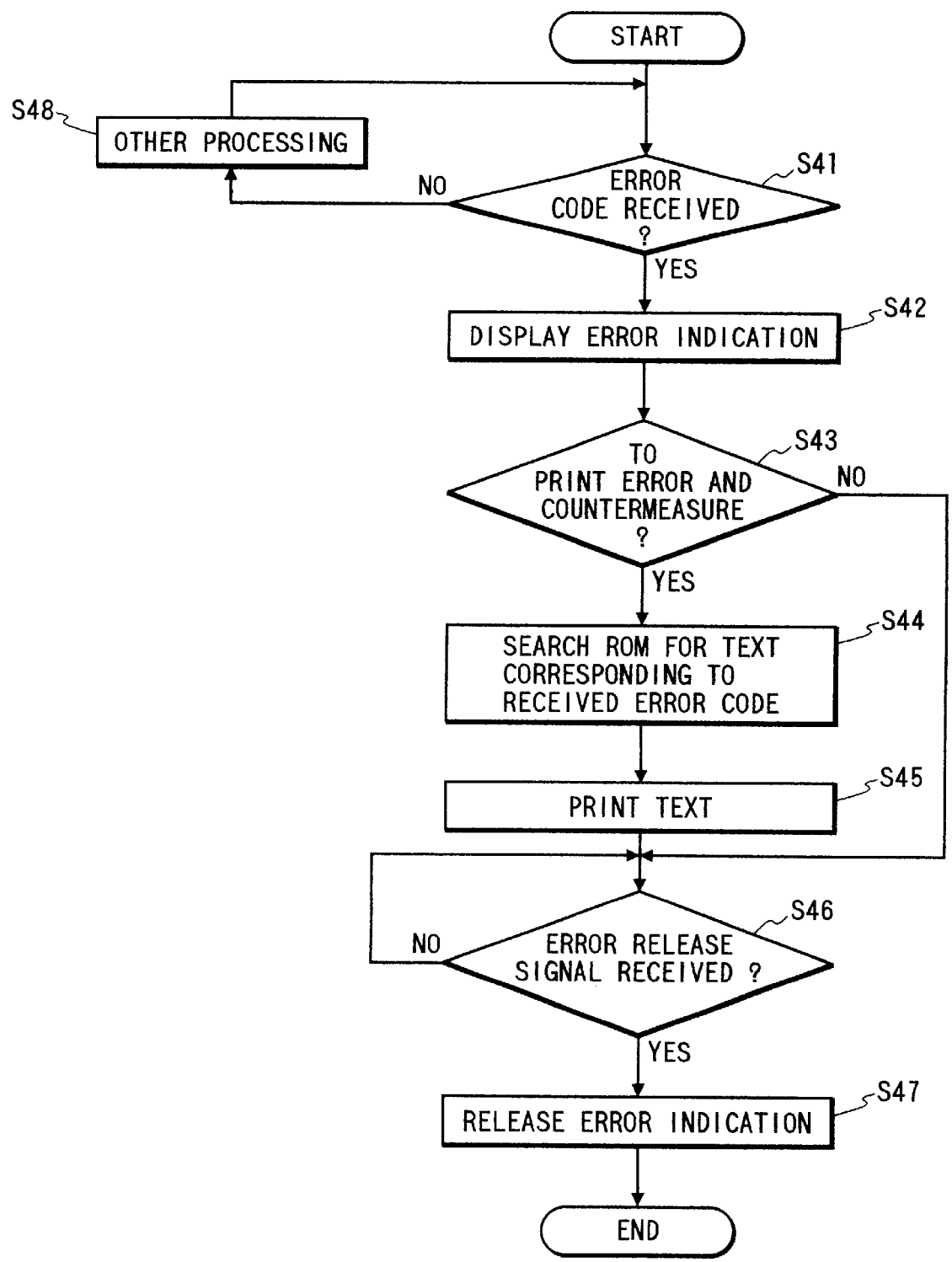
FIG. 4 is a flow chart illustrating a process to be executed by a printing apparatus of this invention.

Next, the process to be executed by the printer 100 will be described with reference to the flow chart of FIG. 4, the process being executed in accordance with a program stored in ROM 120 of the printer 100.

At Step S41 it is checked whether an error code has been received from the digital camera 200. If it is judged at Step S41 that an error code has been received, an error is displayed by LEDs or the like of the printer.

It is judged at Step S43 whether the user has designated to print the error contents and error countermeasure of the digital camera. If designated at Step S43, the flow advances to Step S44 whereat the contents of ROM 120 are searched by using the received error code. At Step S45, the text (error contents and error countermeasure) corresponding to the error code is printed to follow Step S46. If not designated at Step S43, the flow skips to Step S46.

At Step S46 it is checked whether the error removal signal has been received from the digital camera 200. If received, the flow advances to Step S47 to stop the error display on LEDs or the like.

If not received at Step S41, another process (an ordinary print process or the like) is performed at Step S48.

A large number of error types of a digital camera may exist. However, it is difficult to display the detailed contents of each error on the digital camera side. Although the digital camera may be provided with a display function or an error alarming LED, an additional function or component is not suitable for a portable digital camera from the viewpoint of cost and easy-to-use. In contrast, according to the embodiment, the error contents as well as the error countermeasure can be printed out from the printer regardless of whether they are printed in detail. It is also unnecessary to open a manual each time error occurs and confirm the reason of the error from the error code. The printed-out recording sheets may not be left but may be disposed so that each error can be efficiently dealt with. A digital camera capable of being connected directly to the printer of the embodiment is required only to have a minimum display unit necessary for photographing, and can be realized with simple structure, low cost and light weight.

FIG. 5 shows the memory map of a text storing ROM of the printer of this embodiment. ROM of the printer of this embodiment stores therein the operation manuals of the printer, digital camera and communications method, and the error contents and countermeasure corresponding to each error code, respectively in the form of text. Each item of texts can be selected by a user or by an error code, and the selected item only is printed out.

As described so far, according to the first embodiment of the invention, in a system having a printer and a digital camera directly connected to the printer, the operation manual and error countermeasure of each apparatus are stored in the memory of the printer in the form of text. A necessary item selected by a user is printed out so that a communications system efficient and easy to use can be realized.

In this embodiment, although the operation manual and error countermeasure of each apparatus are stored in the form of text, they may be stored also in the form of graphics and images so as to print a graph, illustration and the like.

Second Embodiment

A second embodiment will be described. In the first embodiment, the system has one printer and one digital camera directly connected thereto. In the system of the second embodiment, a plurality of communications apparatuses can be connected at the same time to one printer.

Figure 6:
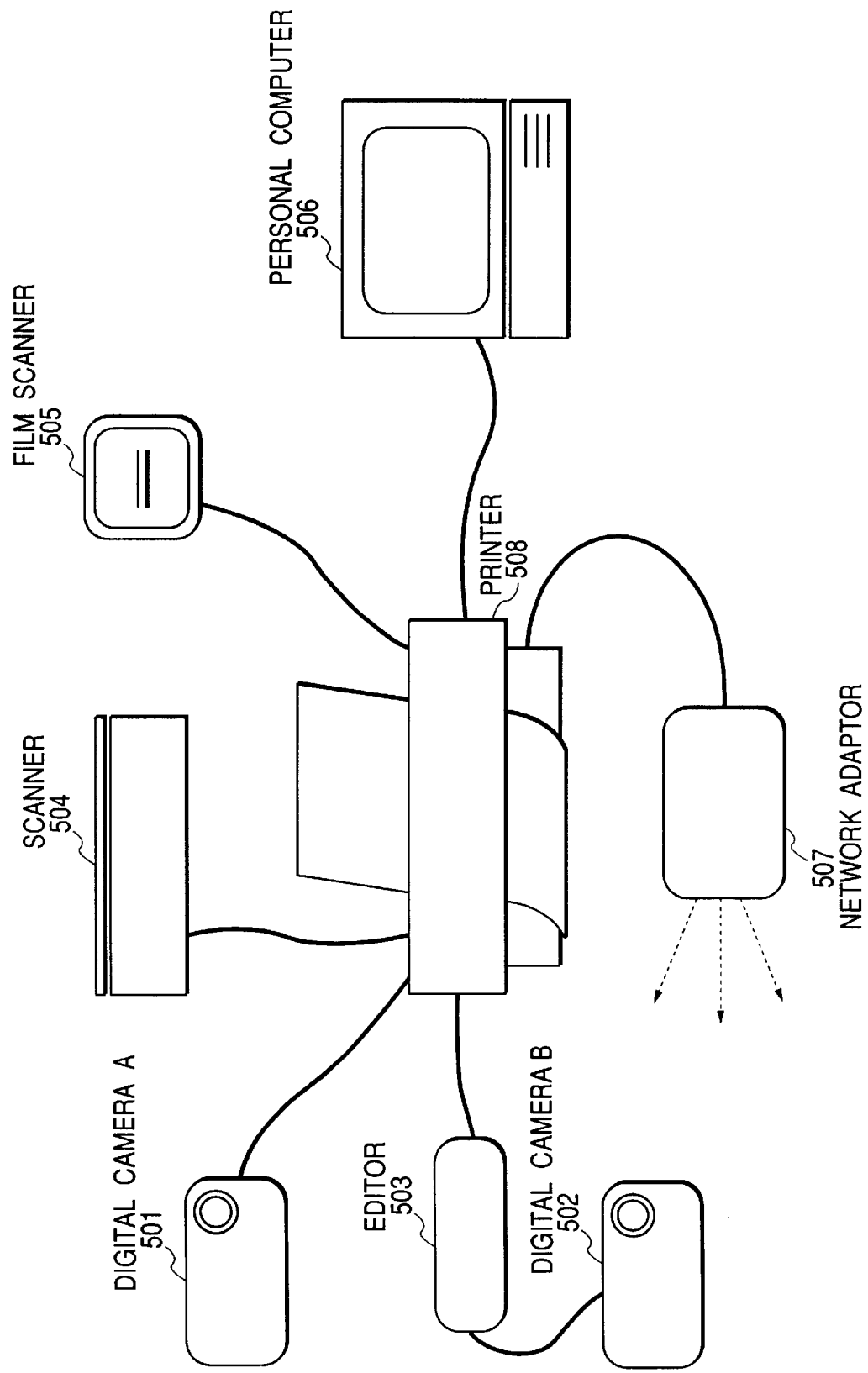
FIG. 6 is a diagram illustrating a communications type of this invention.

FIG. 6 shows a communications system configuration of the second embodiment. A printer 508 of this embodiment can communicate with all apparatuses 501 to 506 at the same time, or with desired ones by changing the connection of cables. The printer 508 is similar to the printer 100 of the first embodiment. A digital camera 501 is similar to that of the first embodiment. A digital camera 502 is different from that of the first embodiment, but an output image of this camera 502 is edited by an editor 503 and thereafter printed by the printer 508. An image picked up by a scanner 504 is printed by the printer 508 to thereby realize a copy function. As different from the digital camera, a film scanner 505 scans a developed silver-salt film, and the scanned image at a size desired by a user can be printed by the printer 508. A personal computer 506 connected to the printer 508 can be used generally in a most versatile manner. A network adapter 507 can communicate with other apparatuses unable to be directly connected to the printer 508.

Similar to the first embodiment, the printer of the second embodiment can print data supplied from other apparatuses connected to the printer. All apparatuses of this embodiment are not necessarily required to have a print function. For example, if the personal computer 506 has a sufficient display function, the printer is not necessary to print out.

Texts of operation manuals and the like may be stored in ROM of the printer or in a memory of each communication partner apparatus. In the second embodiment which deals with a number of different apparatus types by using the common interface, it is difficult to store all texts of an operation manuals and the like in the memory of the printer. In such a case, it is efficient to store texts in memories of respective apparatuses connected to the printer. Even if the printer and its peripheral apparatuses are changed because of version-up, this change can be easily dealt with.

Similar to the first embodiment, the operation manuals of the printer and communication partner apparatuses can be printed out in a manual print mode. A user confirms that the power source of the printer is on, and enters an instruction from the panel of the printer to start a manual print mode. The user selects one of the operation manuals of a plurality of apparatuses capable of being communicated. At this time, the manuals of the apparatuses already in the communications state may be printed out automatically with a priority over other apparatuses not connected.

When one mode is selected, the printer 508 automatically prints out the manual corresponding to the selected mode in the form of text. In this case, if the manual of the selected apparatus is stored in the memory of the printer, this memory is accessed to print out the manual, whereas if the manual is not stored in the memory of the printer, the printer transmits a manual request signal to the selected apparatus which in turn sends back the manual to the printer 508. Upon reception of this manual, the printer 508 prints it out. Obviously, this operation assumes that the power source of the selected apparatus is on and the cable is connected to the printer 508.

The manual print mode may be designated at an apparatus different from the printer. For example, the manual print mode may be designated at an apparatus whose manual is desired to be printed, and the manual is printed out from the printer 508.

The feature of this embodiment resides in that data such as manuals of the printer and apparatuses communicating with the printer is supplied. The location of storing such data or the location at which a manual print is designated is not limited specifically.

Next, an error countermeasure to be performed when an error in data communications between the printer and a destination occurs will be described. It is assumed that an error occurs from some reason during printing or during data communications with a destination. If the reason of the error belongs to the printer, an error code is displayed on the panel of the printer similar to the first embodiment. If the printer can still print out, this error code may be printed out.

If the reason of the error does not belong to the printer and communications with the communication partner is impossible, a connection error is displayed or printed out to notify the user of such an effect. If the reason of the error belongs to the communication partner apparatus although communications with the partner apparatus is possible, a type and error code of the apparatus is transmitted to the printer via the communications cable. The printer accesses its ROM by using the transmitted error code as a search key to read the text of the error contents and error countermeasure and print them out automatically or in response to a user selection. If the text corresponding to the error contents is stored in the memory of the communications partner apparatus, this apparatus reads the error contents corresponding to the error code and transmits the error contents back to the printer which in turn prints them out.

The feature of this embodiment resides in that in the communications system having a plurality of apparatuses connected to a printer, an operation manual and error countermeasure of each apparatus are stored in the printer or in each apparatus in the form of text, and they are printed out by the printer when requested by a user. Accordingly, a plurality type of manuals can be managed in a simple manner and the communications system can be made efficient.

Next, an IEEE 1394 serial bus capable of directly interconnecting a printer and a digital camera according to an embodiment of the invention will be described.

Outline of Technologies of IEEE 1394

With the advent of home digital VTR and DVD, it has become necessary to support communications of a large amount of real time video and audio data. In order to transmit such video and audio data in real time to a personal computer (PC) or to another digital apparatus, interface with necessary communications functions capable of high speed data communications is required. An interface developed from such a viewpoint is IEEE 1394-1995 (High Performance Serial Bus) hereinafter called a 1394 serial bus.

Figure 7:
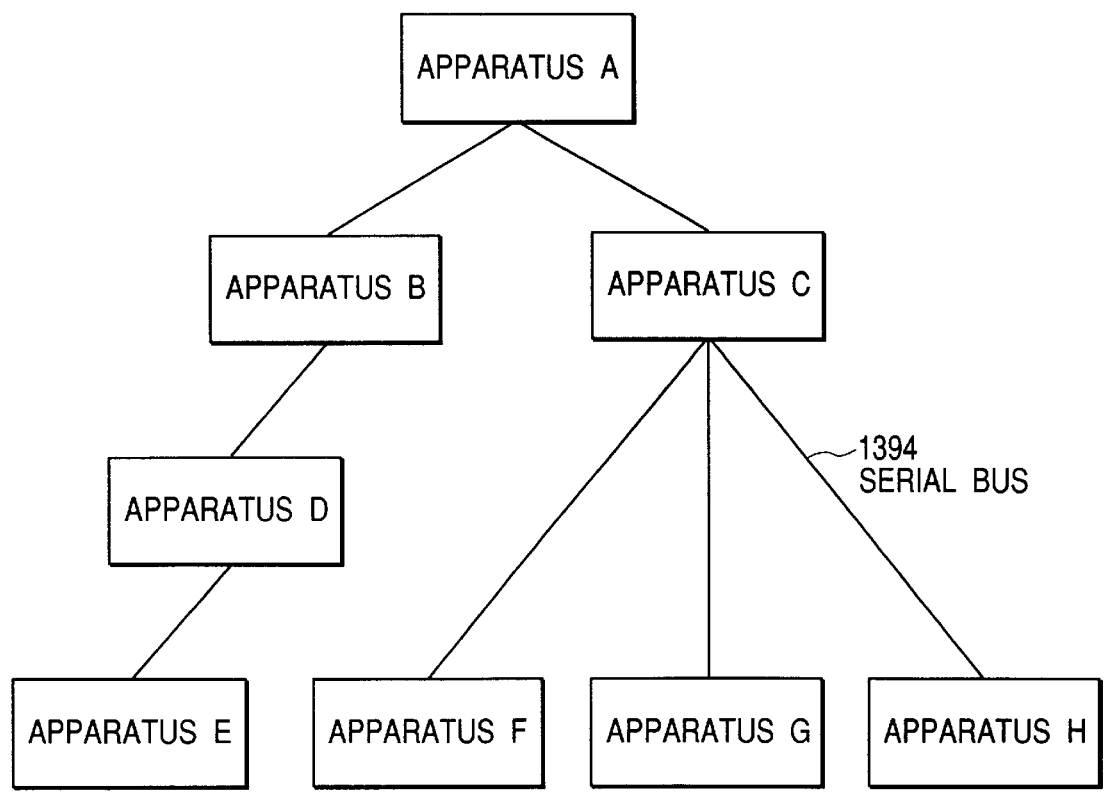
FIG. 7 is a diagram showing the structure of a network according to the invention.

FIG. 7 shows an example of a network system using 1394 serial buses. This system has apparatuses A, B, C, D, E, F, G and H. A twist pair cable of a 1394 serial bus interconnects apparatuses A and B, A and C, B and D, D and E, C and F, C and G, and C and H. Examples of such apparatuses A to H are PC, digital VTR, DVD, digital camera, hard disk, and monitor.

Interconnection among those apparatuses is realized by a mixture of daisy chain connection and node branch connection, which allows a high degree of freedom in connection.

Each apparatus has an ID specific to it, and the apparatuses confirm IDs each other to constitute one network interconnected by 1394 serial buses. Each digital apparatus is sequentially connected by a single 1394 serial bus cable and provided with a proxity function to constitute one network. A Plug & Play function characteristic to the 1394 serial bus allows an apparatus and its connection state to be automatically recognized when the apparatus is connected by the 1394 serial bus cable.

In the system shown in FIG. 7, when some apparatus is removed from or added to the network, a bus reset is automatically performed to reset the network configuration and thereafter reconfigure the network. With this function, the network configuration can be always reset and newly recognized.

The data communications rates are 100/200/400 M bps. The apparatus having a higher communications rate supports the lower communications rate to provide compatibility with different rates.

The data communications modes include an asynchronous communications mode for transmitting asynchronous data (hereinafter called Async data) such as control signals and an isochronous transmission mode for transmitting isochronous data (hereinafter called Iso data) such as real time video and audio data. During each cycle (generally 125 $\mu$s), both the Async data and Iso data are transmitted in a mixed manner with a priority of Iso data transmission, after a cycle start packet (CSP) indicative of a cycle start is transmitted.

Figure 8:
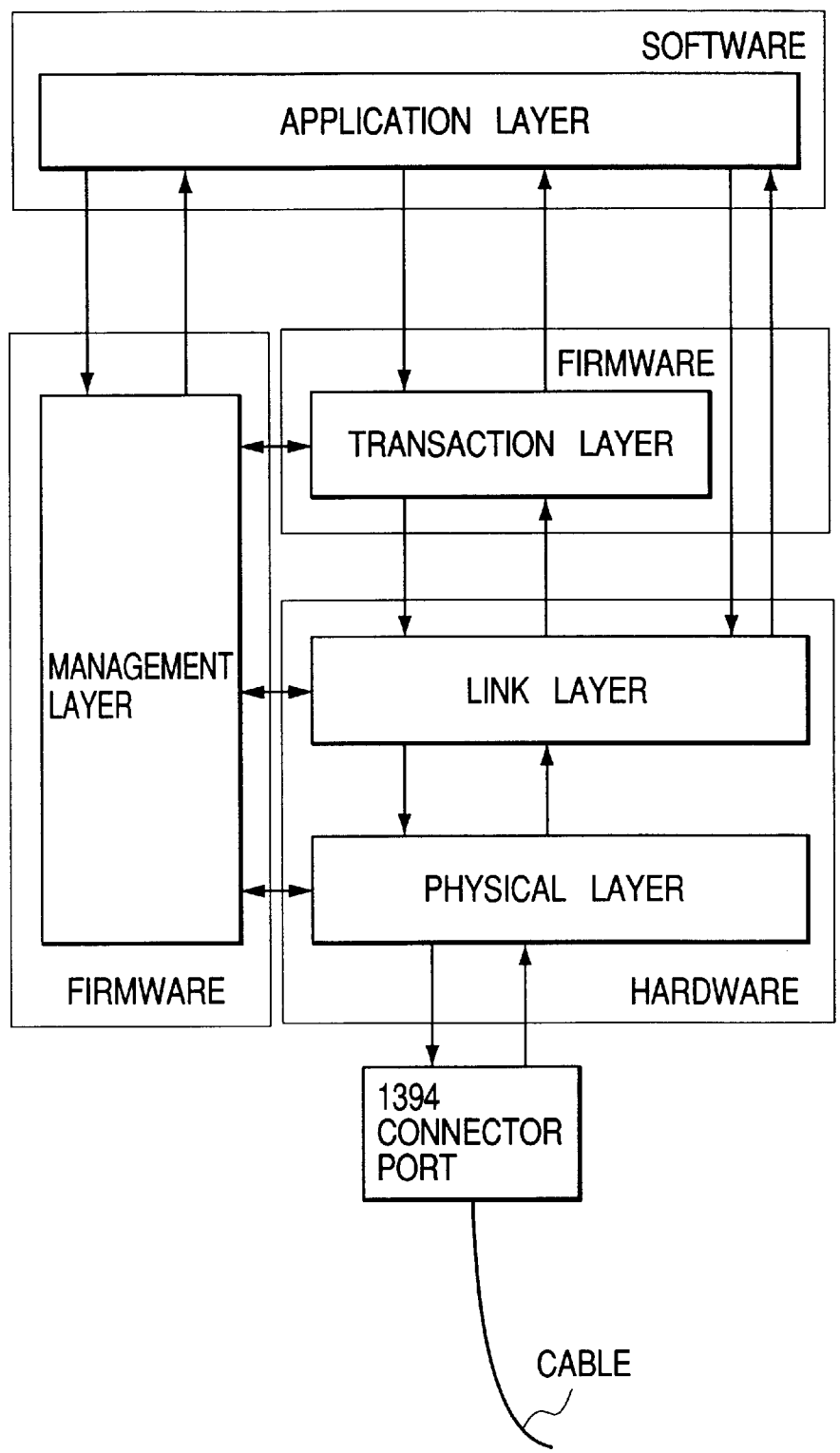
FIG. 8 is a diagram showing constituent elements of a 1394 serial bus according to the invention.

FIG. 8 shows the constituent elements of the 1394 serial bus.

The 1394 serial bus has a layer (hierarchical) structure. As shown in FIG. 8, the 1394 serial bus cable is hardware at the lowest layer, a connector board connected to the connector of the cable is hardware at the next higher layer, and a physical layer and a link layer are hardware at the second next higher layer.

The hardware section is substantially an interface chip. Of the hardware section, the physical layer performs coding, connector control and the like, and the link layer performs packet transfer, cycle time control and the like.

Of a firmware section, a transaction layer manages data to be transferred (transacted) and issues an instruction such as Read and Write. A management layer manages the connection state and ID of each apparatus connected and manages the whole network.

The substantial configuration of the 1394 serial bus is up to this hardware and firmware.

An application layer of a software section becomes different depending upon software to be used, and defines what type of data is supplied to the interface in accordance with a protocol such as an AV protocol.

The configuration of the 1394 serial bus has been described above.

Figure 9:
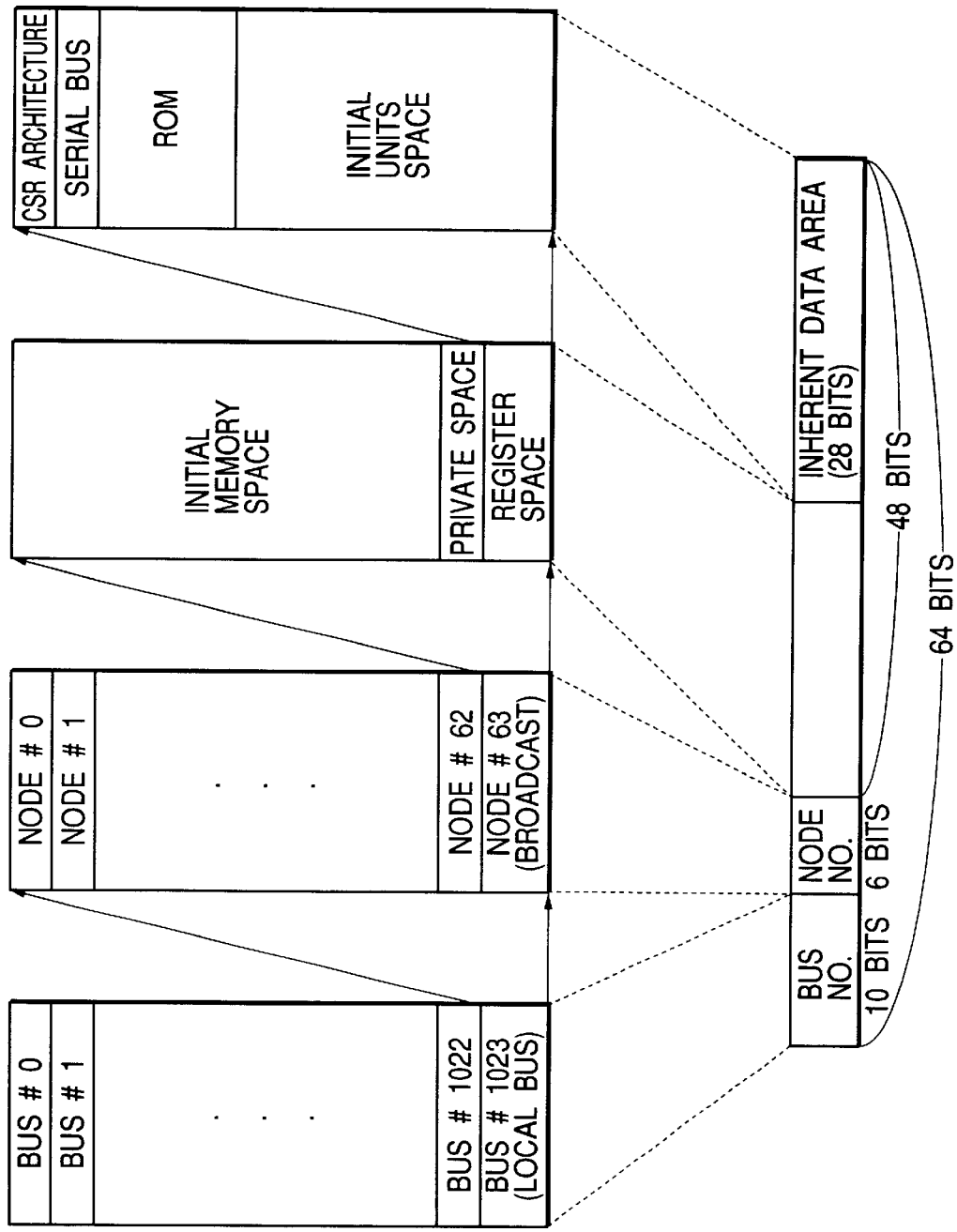
FIG. 9 is a diagram showing an address space of a 1394 serial bus according to the invention.

FIG. 9 is a diagram showing an address space of the 1394 serial bus.

Each apparatus (node) connected to the 1394 serial bus has a 64-bit address specific to each node. This address is stored in a ROM so that the node address of its own or another apparatus can be recognized always and communications with a designated partner can be performed.

Addressing of the 1394 serial bus is in conformity with IEEE 1212 specifications. The first 10 bits are used for designating a bus number, and the next 6 bits are used for designating the node ID. The remaining 48 bits are assigned to the apparatus and can be used as the address space specific to each apparatus. The last 28 bits form an inherent data area in which data regarding discrimination of each apparatus and designation of use conditions is stored.

The outline of technologies of the 1394 serial bus has been given above.

Next, techniques characteristic to the 1394 serial bus will be detailed.

Electrical Specifications of 1394 Serial Bus

Figure 10:
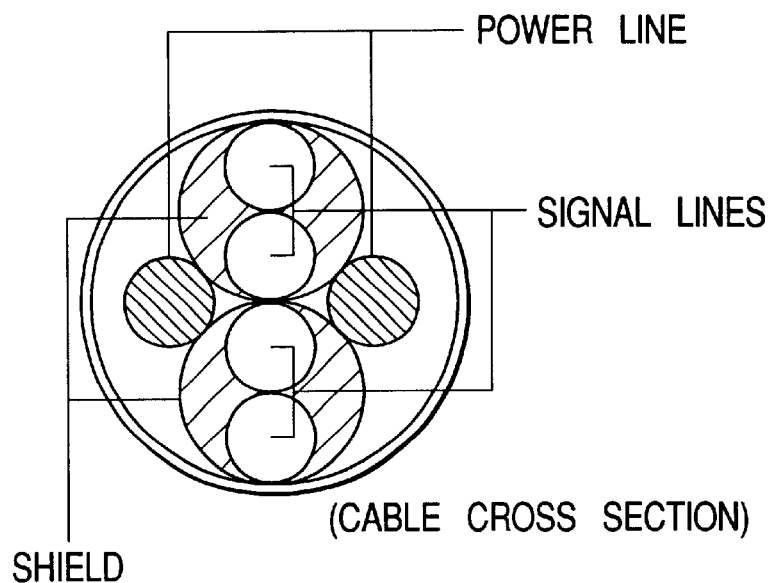
FIG. 10 is a cross sectional view of a 1394 serial bus cable according to the invention.

FIG. 10 is a cross sectional view of a 1394 serial bus cable.

The cable of a 1394 serial bus has a power line in addition to two pairs of twist pair signal lines. Therefore, power can be supplied to an apparatus without a power source and to an apparatus with a power source voltage lowered by trouble.

It is defined that the voltage of a power source supplied via the power line is 8 to 40 V and the current thereof is DC 1.5 A.

DS-Link Coding

Figure 11:
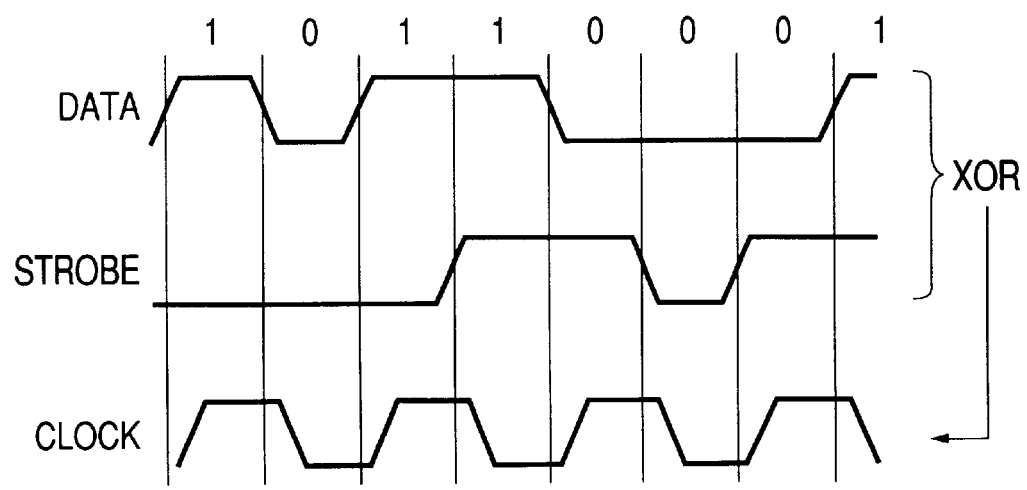
FIG. 11 is a diagram illustrating a DS-Link coding method according to the invention.

FIG. 11 illustrates a DS-Link coding scheme with the data communications format adopted by the 1394 serial bus.

The 1394 serial bus adopts the DS-Ling (Data/Strobe Link) coding scheme which is suitable for high speed serial data communications. The cable has two pairs of signal lines. Main data is transmitted over one twist pair signal line, whereas a strobe signal is transmitted over the other twist pair signal line.

On the reception side, a clock is reproduced from an exclusive OR of the transmitted data and strobe as illustrated in FIG. 11.

A merit of using the DS-Link encoding scheme is that a communications efficiency is higher than other serial data communications, that a PLL circuit is not necessary so that a circuit scale of a control LSI can be made small, and that it is not necessary to transmit information of an idle state when there is no data to be transmitted so that a transceiver circuit of each apparatus can be set to a sleep state and the consumption power can be reduced.

Sequence of Bus Reset

With the 1394 serial bus, each apparatus (node) connected is assigned a node ID to recognize the network configuration.

When the network configuration changes, for example, when the number of nodes changes because some node is disconnected or connected or the power source is turned on or off, it is necessary to recognize the new network configuration. In such a case, each node detected a change transmits a bus reset signal to the bus to enter a mode of recognizing the new network configuration. In detecting such a change, a change in the bias voltage at a board of a 1394 port is detected.

Immediately upon reception of the bus reset signal transmitted from some node, the physical layer of each node notifies the link layer of a generation of the bus reset and transmits the bus reset signal to other nodes. The bus reset is activated after all the nodes finally detect the bus reset signal.

The bus reset is activated, upon the above-described hardware detection of connection/disconnection of a cable or a network abnormality, by a direct instruction to the physical layer through host control by using a protocol, or by other means.

As the bus reset is activated, the data transmission is temporarily intercepted, and new data transmission is made to stand by. After the bus reset, the data transmission resumes under the new network configuration.

The above description has been directed to the bus reset sequence.

Sequence of Node ID Determination

After the bus reset, each node enters an ID assignment mode in order to set the new network configuration. General sequences from a bus reset to a node ID determination will be described with reference to the flow charts shown in FIGS. 19, 20, 21A and 21B.

Figure 19:
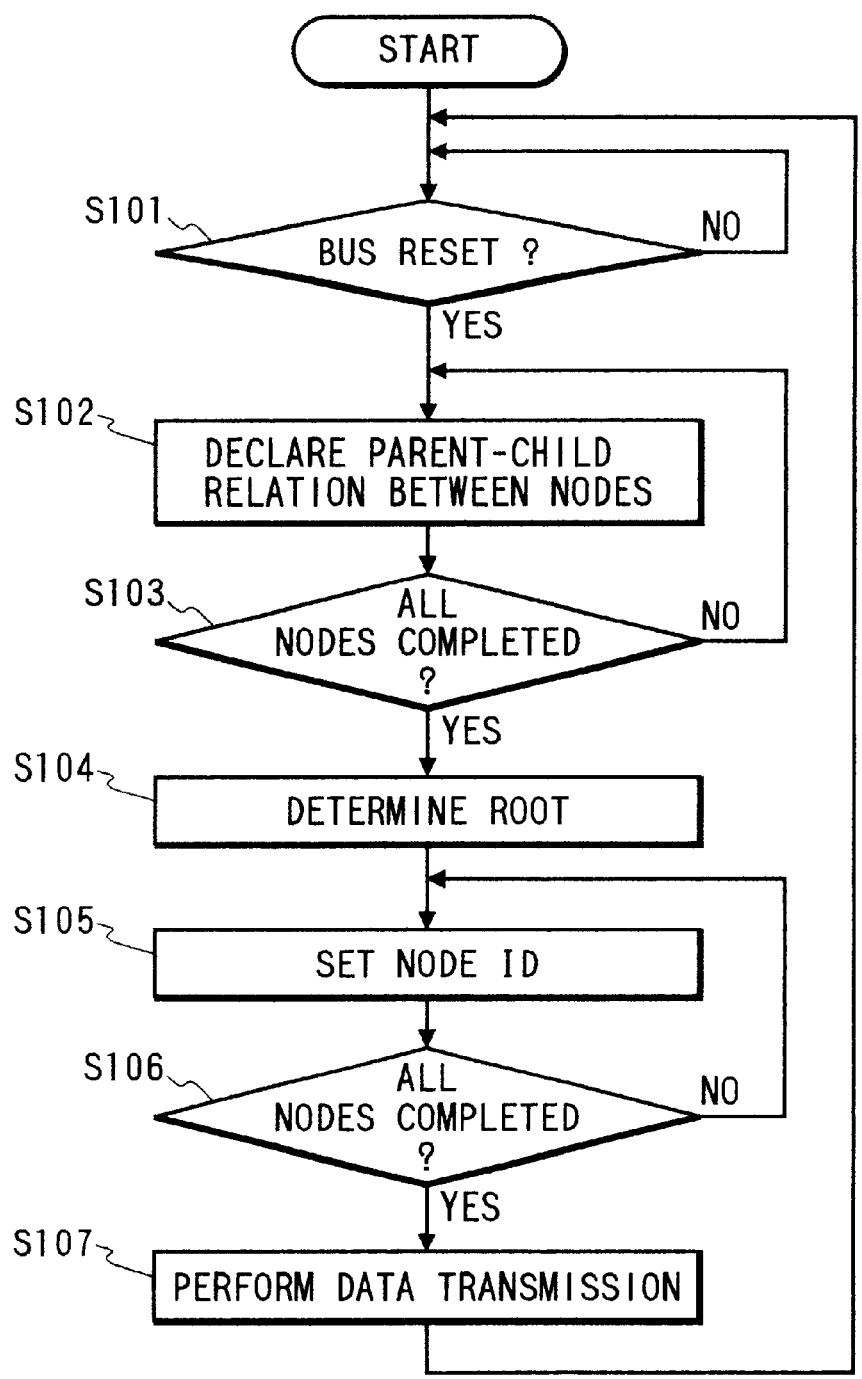
FIG. 19 is a flow chart illustrating a sequence from a bus reset to a node ID determination according to the invention.

The flow chart of FIG. 19 illustrates a series of bus processes until the data transmission is permitted after the bus reset occurs and each node ID is determined.

First, at Step S101 an occurrence of a bus reset in the network is always monitored, and if a bus reset occurs because of an on/off of the power source at some node, the flow advances to Step S102.

At Step S102 a parent-child relation between interconnected nodes in the reset state of the network is declared to know the connection state of the new network. If the parent-child relation between all nodes is determined, one route is established at Step S104. Until the parent-child relation between all nodes is determined, the parent-child relation declaration is repeated at Step S102 and the route is not established.

After the route is established at Step S104, a node ID setting operation is performed to assign each node an ID at Step S105. A node ID is set in a predetermined order of nodes, and this setting operation is repeated until IDs are assigned to all nodes. As all the nodes are assigned IDs finally at Step S106, all the nodes recognize the new network configuration so that data transmission between nodes is allowed at Step S107 to resume data transmission.

In the state at Step S107, the bus reset monitoring mode resumes, and if a bus reset occurs, the node ID setting operation is repeated at Steps S101 to S106.

Figure 20:
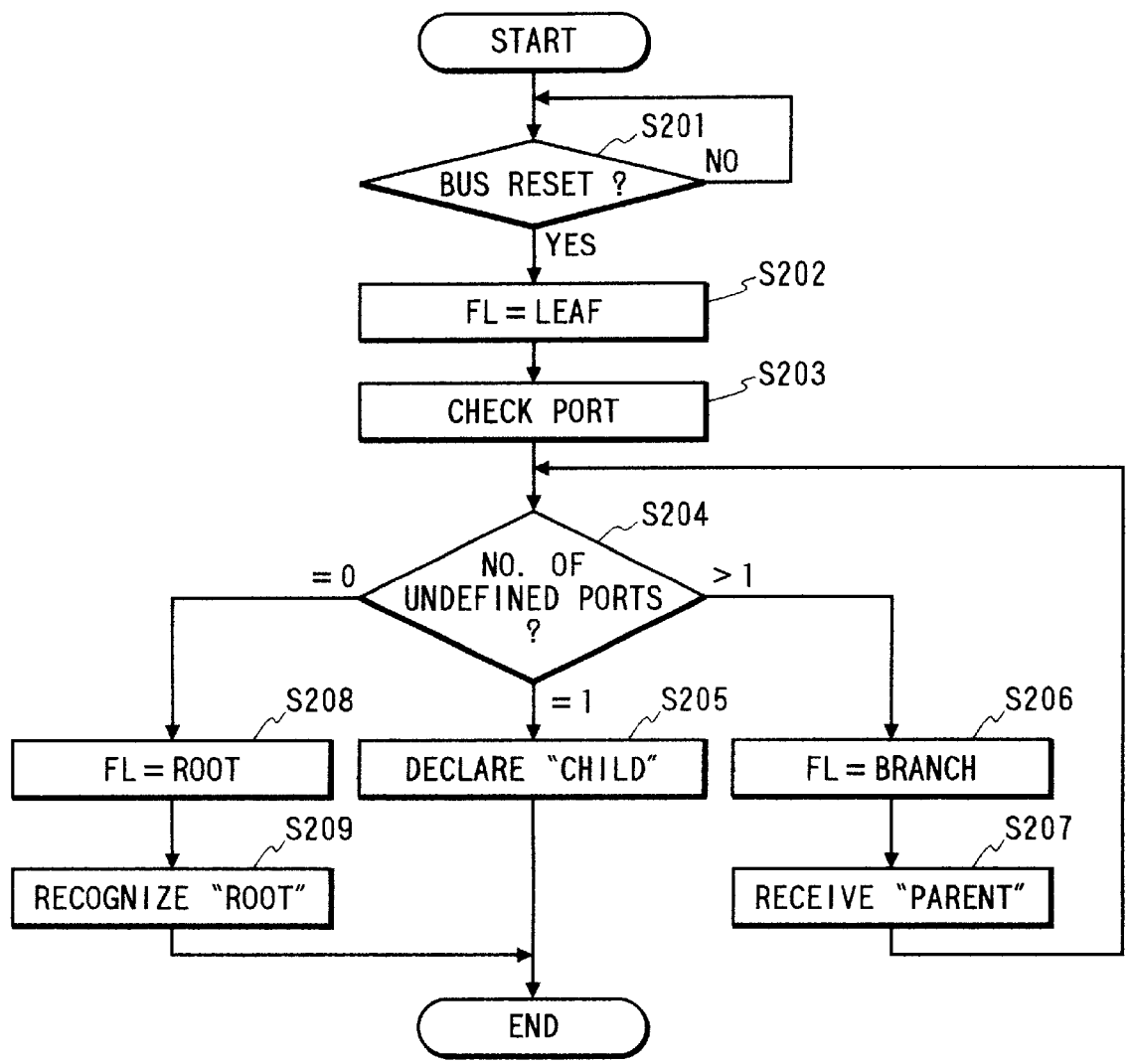
FIG. 20 is a flow chart illustrating another sequence from a bus reset to a node ID determination according to the invention.
Figure 21:
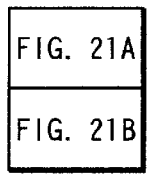
FIG. 21 is comprised of FIGS. 21A and 21B showing flow charts illustrating another sequence from a bus reset to a node ID determination according to the invention.
Figure 21A:
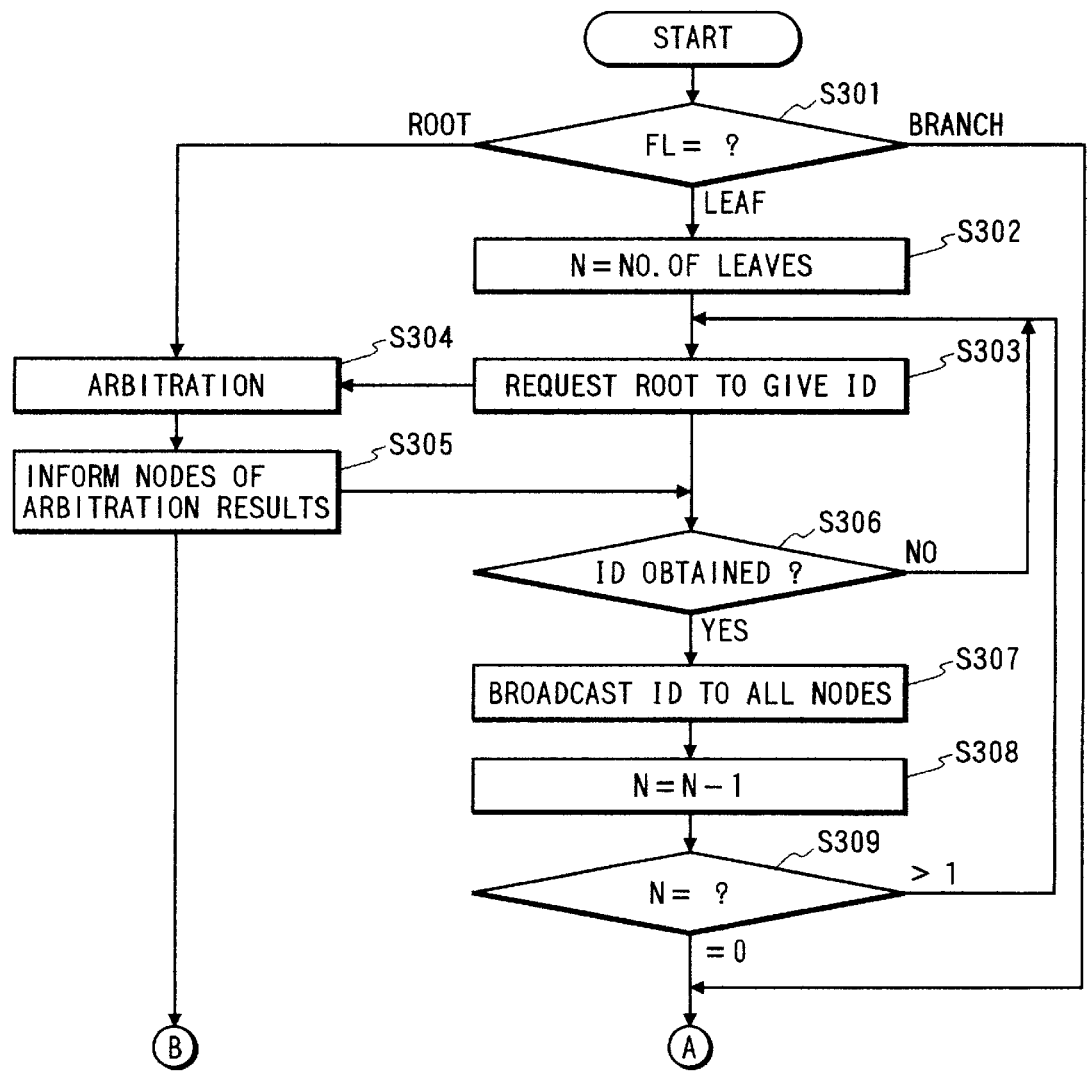
Figure 21B:
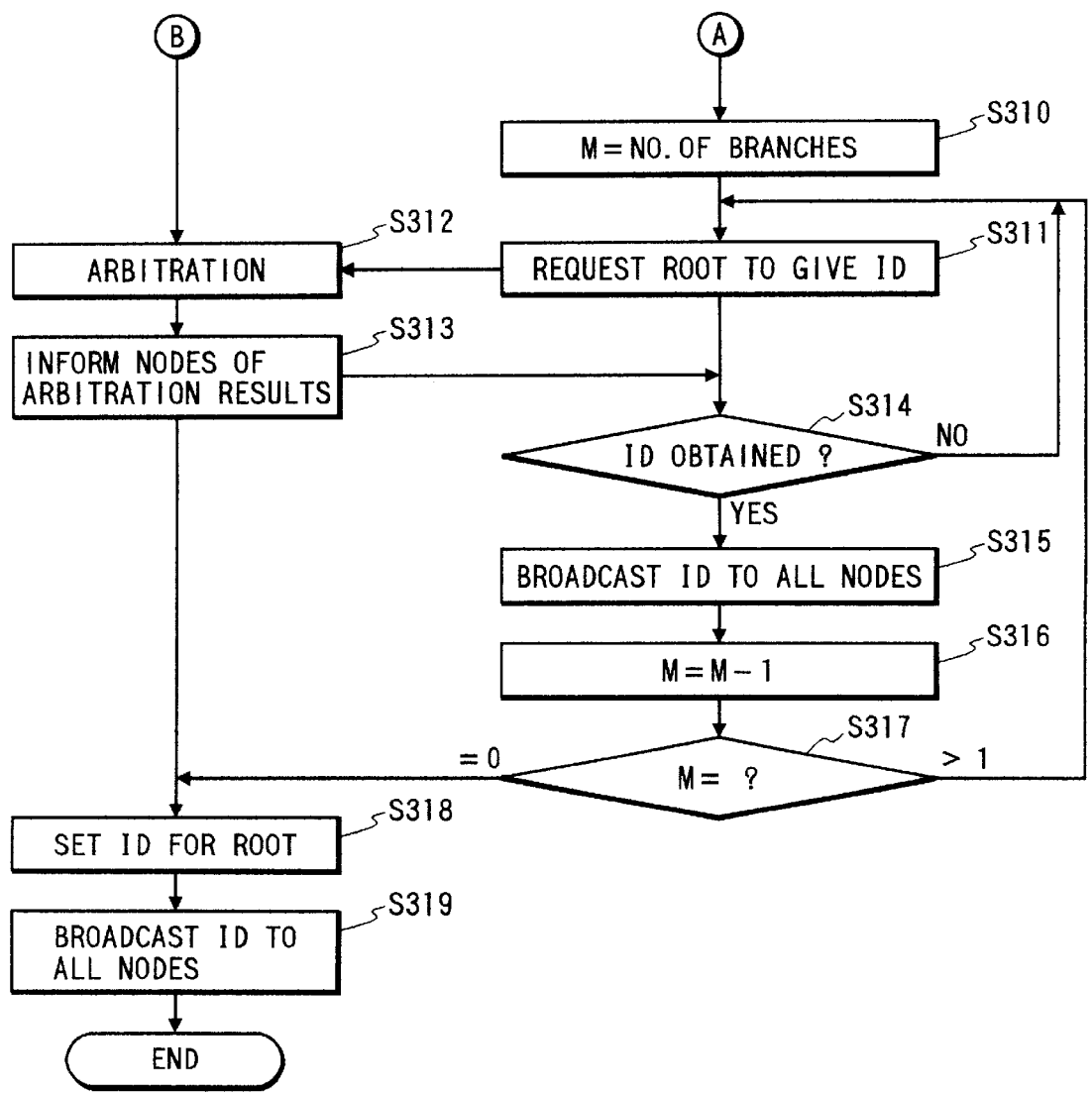

The above description has been directed to the flow chart shown in FIG. 19. The flow charts of FIGS. 20, 21A and 21B give the more detailed processes from the bus reset to the route establishment and from the route establishment to the ID setting, respectively illustrated in the flow chart of FIG. 19.

First, the flow chart of FIG. 20 will be described.

As a bus reset occurs at Step S201 whereat a bus reset is always monitored, the network configuration is once reset.

As the first step of recognizing again the connection state of the reset network, at Step S202 each apparatus is set with a flag indicating that the apparatus is a leaf (node). At Step S203 each node checks the number of its ports connected to other nodes.

Depending upon the number of ports checked at Step S203, the number of ports undefined (the parent-child relation is not still determined) is checked for the preparation of the parent-child relation declaration. Immediately after the bus reset, the number of ports is equal to the number of undefined ports. As the parent-child relation is determined progressively, the number of undefined ports at Step S204 changes.

A node which can declare a parent-child relation immediately after the bus reset, is limited only to leaves which can be confirmed from the number of ports at Step S203. At Step S205 a leaf declares to the node connected thereto that "I am a child and you are a parent".

Regarding a node which was recognized to be a branch since there are a plurality of ports at Step S203, the number of undefined ports at Step S204 immediately after the bus reset is larger than "1". Therefore, the flow advances to Step S206 whereat a branch flag is set, and at Step S207 it stands by in order to acknowledge a "parent" of the parent-child relation declaration from a leaf.

As the leaf declares the parent-child relation, the branch acknowledges it at Step S207 and checks whether the number of undefined ports is "1". If "1", it becomes possible to declare to the node connected to the remaining port that "I am a child" at Step S205. If the branch has the number of undefined ports equal to or larger than "2" at the second trial or later, it stands by again to acknowledge a "parent" from a leaf or another branch.

Finally, if one branch or exceptionally one leaf (because a child declaration was not performed quickly) has the number of undefined ports equal to "0", it means that the parent-child relation declaration was completed in the whole network. Therefore, the single node having the number of undefined nodes equal to "0" (all ports were determined as the parent) is set with a root flag at Step S208, and it is recognized at Step S209 that this node ia a root node.

In the above manner, the operation illustrated in the flow chart of FIG. 20, from the bus reset to the parent-child relation declaration of all nodes in the whole network, is completed.

Next, the process illustrated in the flow charts shown in FIGS. 21A and 21B will be described.

Since leaf, branch, and root flags were set to respective nodes by the sequence illustrated in the flow chart of FIG. 20, it is checked at Step S301 which flag was set to each node.

In assigning each node an ID, the node which can be set with an ID first is a leaf. IDs starting from the small number (in the order of node numbers 0, 1, 2, . . . ) are assigned in the order of leaf, branch and root node.

The number N (N is a natural number) of leaves present in the network is set at Step S302. At Step S303 each leaf requests the root to supply an ID. If there is a plurality of such requests, the root performs arbitration (limiting to one request) at Step S304. The node selected through arbitration is assigned an ID number, and the node not selected is notified of a failure. The leaf failed in acquiring the ID number issues again an ID request at Step S306 to repeat the above operations. The leaf acquired the ID number broadcasts the ID information to all other nodes at Step S307. After the node ID information is broadcast, the number of remaining nodes is decremented by one at Step S308. If the number of remaining nodes is "1" or larger at Step S309, the ID request operation at Step S303 is repeated. If all the leaves broadcast the ID information finally, N takes a value "0" at Step S309 to follow ID settings of branches.

ID setting of branches is performed in the similar manner to the leaves.

First, the number M (M is a natural number) of branches present in the network is set at Step S310. At Step S311 each branch requests the root to supply an ID. If there is a plurality of such branches, the root performs arbitration at Step S312. The branch selected through arbitration is assigned an ID number following the last number assigned to the leaf. At Step S313, the root supplies the ID information or a failure notice to each requested branch. At Step S314, the branch failed in acquiring the ID information again issues the ID request to repeat the above operations. The branch acquired the ID number broadcasts the ID information to all other nodes at Step S315. After the node ID information is broadcast, the number of remaining branches is decremented by one at Step S316. If the number of remaining branches is "1" or larger at Step S317, the ID request operation at Step S311 is repeated until all the branches broadcast the ID information finally. If all the branches acquire the node IDs, M takes a value "0" at Step S317 to terminate the ID acquiring mode of branches.

At this time, the node still not acquiring the ID information is only the root node. Therefore, at Step S318 the root node assigns its own ID number which is the smallest number still not used. At Step S319, the ID information of the root node is broadcast.

The sequence illustrated in FIGS. 21A and 21B, from the parent-child relation determination to the settings of IDs of all nodes, is completed.

Next, the operation in an actual network shown in FIG. 12 will be described by way of example.

Figure 12:
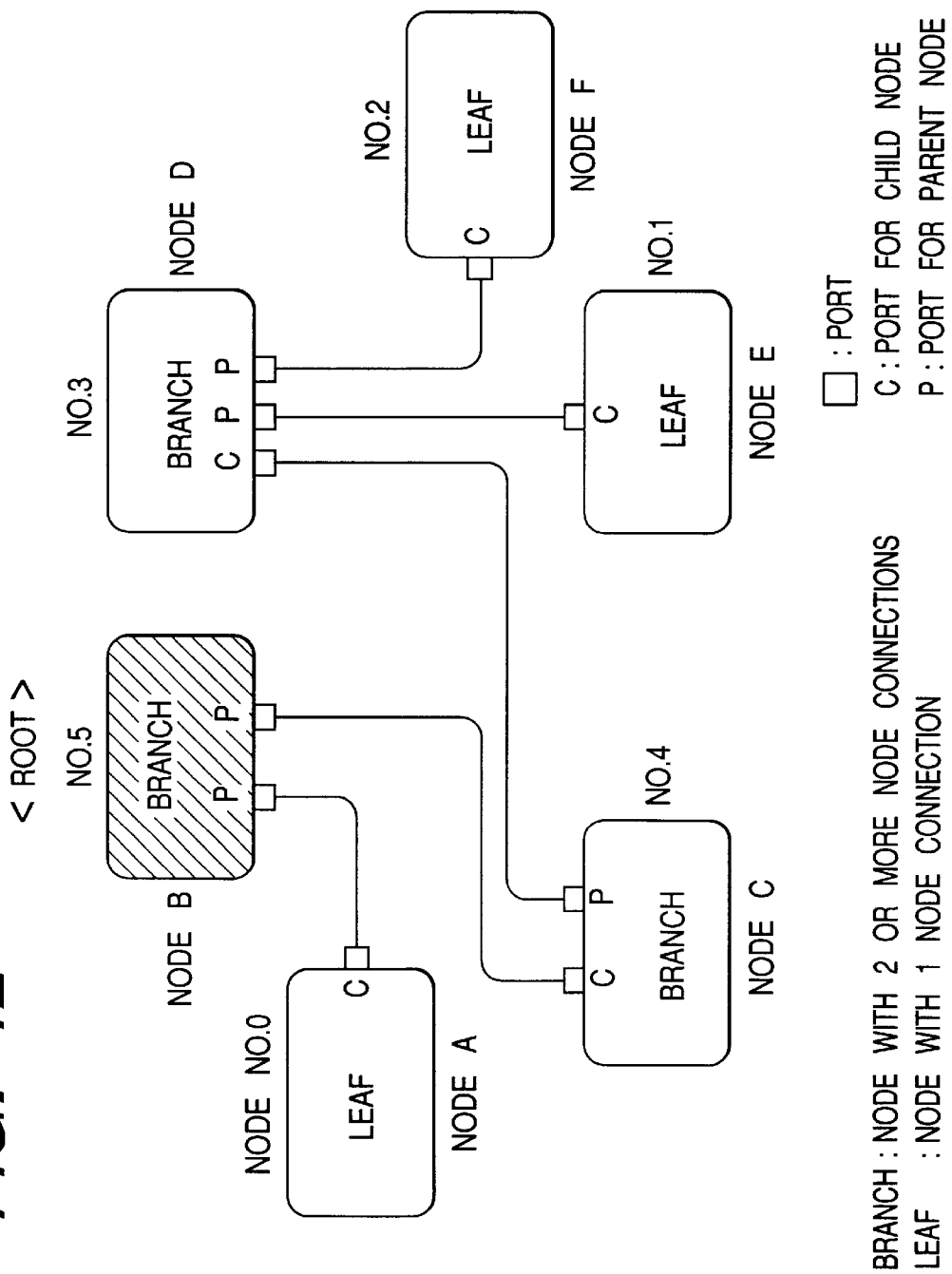
FIG. 12 is a diagram illustrating the operation of a network according to the invention.

In the example of the hierarchical structure shown in FIG. 12, a node A and a node C are directly connected to a (root) node B as a lower level thereof, a node D is directly connected to the node C as a lower level thereof, and a node E and a node F are directly connected to the node D as a lower level thereof. This hierarchical structure, and a process of determining a root node and a node ID will be described.

After a bus reset occurs, a parent-child relation is declared between ports directly interconnected. A parent is at a higher level of the hierarchical structure and a child is at a lower level thereof.

In the example shown in FIG. 12, after the bus reset, the node A first declares the parent-child relation. Basically, a node (called a leaf) which has only one port connected can declare the parent-child relation. Since each node can know whether it has only one port connected, the node can recognize that it is at the end of the network. Of such nodes, the parent-child relation is determined starting from the node first declared. The node (node A between nodes A and B) declared the parent-child relation is determined as a child, and the partner (node B) is determined as a parent. In this manner, a child-parent is determined between nodes A—B, a child-parent is determined between nodes E–D, and a child-parent is determined between nodes F–D.

At the one-step higher level, of the nodes (called branches) having a plurality of ports, the parent-child relation is sequentially declared, starting from those nodes given the parent-child declaration from other nodes. In the example shown in FIG. 12, after the parent-child relation between the node D and the nodes E and F, the node D declares the parent-child relation to the node C so that the child-parent is determined between the nodes D–C.

The node C given the parent-child relation declaration from the node D declares the parent-child relation to the node B connected to the other port so that the child-parent relation is determined between the nodes C–B.

In the above manner, the hierarchical structure shown in FIG. 12 is configured, and the node B having all the ports connected as the parent becomes a root node.

There is only a single root node in one network configuration.

In the example shown in FIG. 12, the node B is determined as the root node. However, another node may become the root node, if another leaf different from the leaf A declared the parent-child relation to the node B declares at the earlier timing. In other words, any branch has a possibility that it becomes the root node, and the root node is not definite even if the network has the same configuration.

After the root node is determined, a mode of determining each node ID starts. In this example, each node determined its own node ID broadcasts it to all other nodes (broadcast function).

The node ID information of each node includes its node number, information of a connection position, information of the number of its ports, the number of ports already connected, and information of the parent-child relation at each port.

The procedure of assigning a node ID number may start from the node (leaf) having only one port already connected. Such nodes are sequentially assigned the node numbers 0, 1, 2, . . . .

The node assigned a node ID broadcasts the information containing the node number to all other nodes so that this ID number can be recognized as "already assigned".

After all the leafs are assigned their node IDs, the branches are assigned node ID numbers following the last node ID number assigned to the leaf. Similar to the leaf, each branch assigned the node ID number broadcasts the node ID information to all other branches, and lastly the root node broadcasts its ID information. Therefore, the root node has always the largest node ID number.

In the above manner, node IDs are assigned to the whole hierarchical structure, the network is reconfigured, and the bus initializing process is terminated.

Arbitration

With the 1394 serial bus, arbitration of a bus use privilege is performed by all means before data transmission. The 1394 serial bus configures a logical bus type network in which each apparatus connected thereto relays a transmitted signal to allow the signal to be transmitted to any apparatus in the network. Therefore, arbitration is essential to prevent collision of packets. In this manner, a packet can be transmitted only to a single node at a certain time.

Figure 13A:
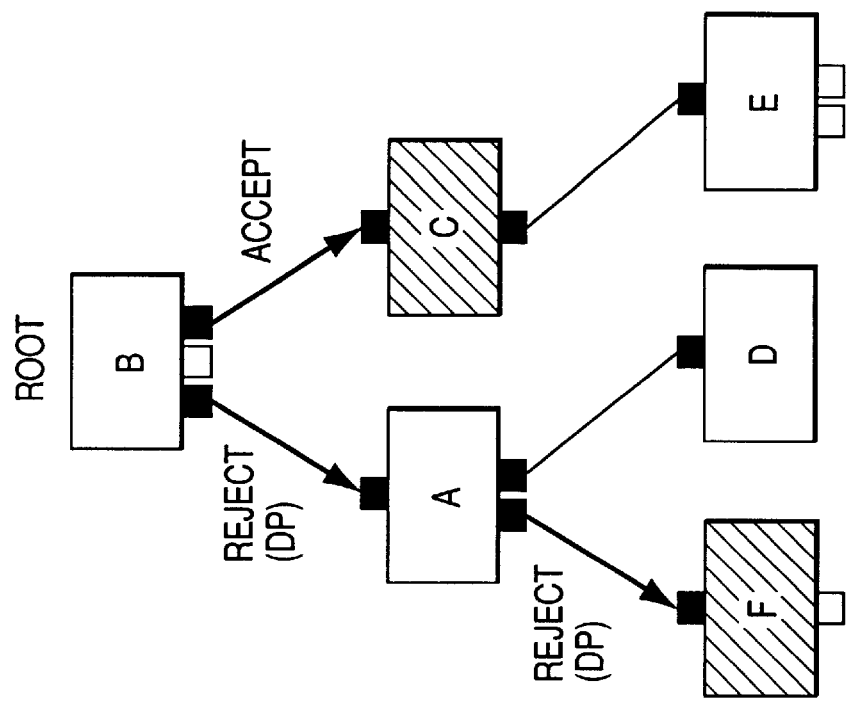
FIGS. 13A and 13B are diagrams illustrating a use request for a serial bus according to the invention.
Figure 13B:
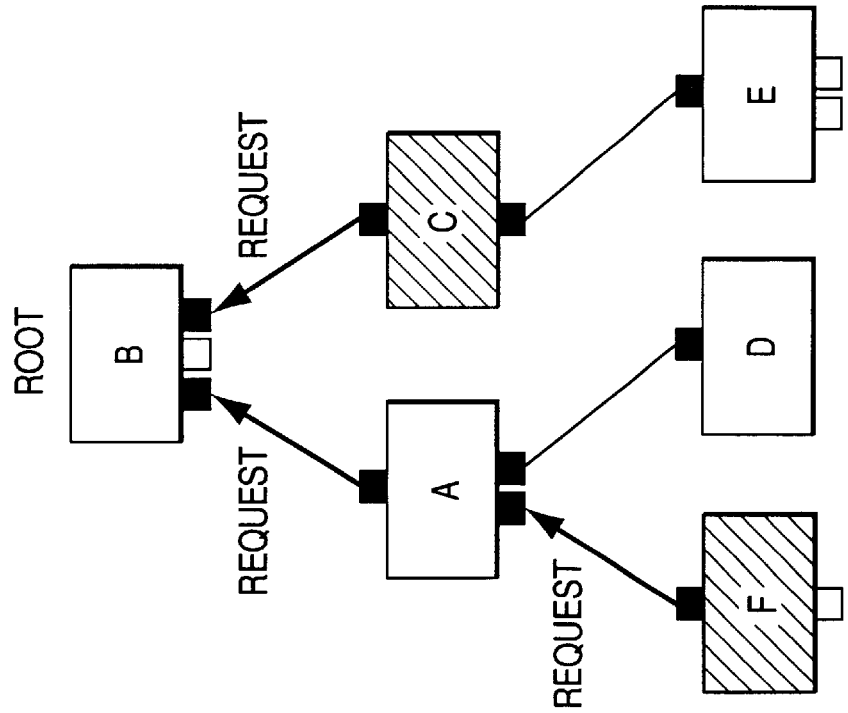

FIGS. 13A and 13B illustrate the arbitration operation, FIG. 13A illustrates a bus use request, and FIG. 13B illustrates a bus use permission.

As arbitration starts, one or a plurality of nodes issue a request for a bus use privilege to the parent node. In FIG. 13A, a node C and a node F issue a request for a bus use privilege. Upon reception of this request, the parent node (node A in FIG. 13A) issues (relays) the request for a bus use privilege to a further parent node. This request is finally received by the root which finally arbitrates.

Upon reception of requests for a bus use privilege, the root node determines which node is permitted to use the bus. This arbitration can be performed only by the root node, and a node which won the arbitration is given a bus use permission. In the example shown in FIG. 13B, the node C is given the use permission, and the node F is rejected in using the bus. A DP (data prefix) packet is transmitted to the node failed in the arbitration to notify it of a failure. A bus use request by the rejected node is suspended until the next arbitration.

The node acquired the bus use permission by the arbitration is allowed thereafter to transmit data.

The arbitration sequence will be described with reference to the flow chart of FIG. 22.

In order to allow a node to start data transmission, it is necessary that the bus is in an idle state. In order to confirm that the bus is currently in the idle state after the preceding data transmission is completed, each node judges that the data transmission can be started, after a lapse of a predetermined idle time gap length (e.g., subaction gap) specifically set to each communications mode.

At Step S401 it is judged whether a predetermined gap length corresponding to transmission data such as Async data and Iso data is obtained. Unless the predetermined gap length is not obtained, a request for a bus use privilege allowing the start of data transmission cannot be issued. Each node therefore stands by until the predetermined gap length is obtained.

If the predetermined gap length is obtained at Step S401, it is checked at Step S402 whether there is data to be transmitted. If there is data, at Step S403 a request for a bus use privilege is issued to the root in order to acquire the bus and transmit data. As shown in FIG. 13, a signal representative of the request for a bus use privilege is transmitted to the final root, by being relayed by respective apparatuses. If there is no data to be transmitted at Step S402, the flow terminates.

Next, at Step S404 if the root receives one or more bus use requests, the root checks at Step S405 the number of nodes from which the use request was issued. If the number of nodes issued the use privilege request is "1" at Step S405, this node is given the bus use permission. If the number of nodes issued the use privilege request is larger than "1" at Step S405 (if there are a plurality of nodes issued the use privilege request), then at Step S406 the root performs arbitration in order to determine a single node to which a user permission is given. This arbitration is made fair and each node is given the privilege equally so as not to give the permission always to the same node.

At Step S407 it is checked whether each of the plurality of nodes issued the use request at Step S406 is the node permitted to use the bus through the arbitration or the node failed in the arbitration. At Step S408 the root transmits a permission (acceptance) signal to the node permitted to use the bus through the arbitration or to the node given the use permission without the arbitration because of the number of nodes issued the use request is "1" at Step S405. The node received the permission signal starts transmission of data (packet) immediately after the reception of the permission signal. At Step S409, the root transmits a DP (data prefix) packet indicating a failure in the arbitration to the node not permitted to use the bus. In order to issue the bus use request again, the node received this packet stands by at Step S401 until the predetermined gap length is obtained.

Figure 22:
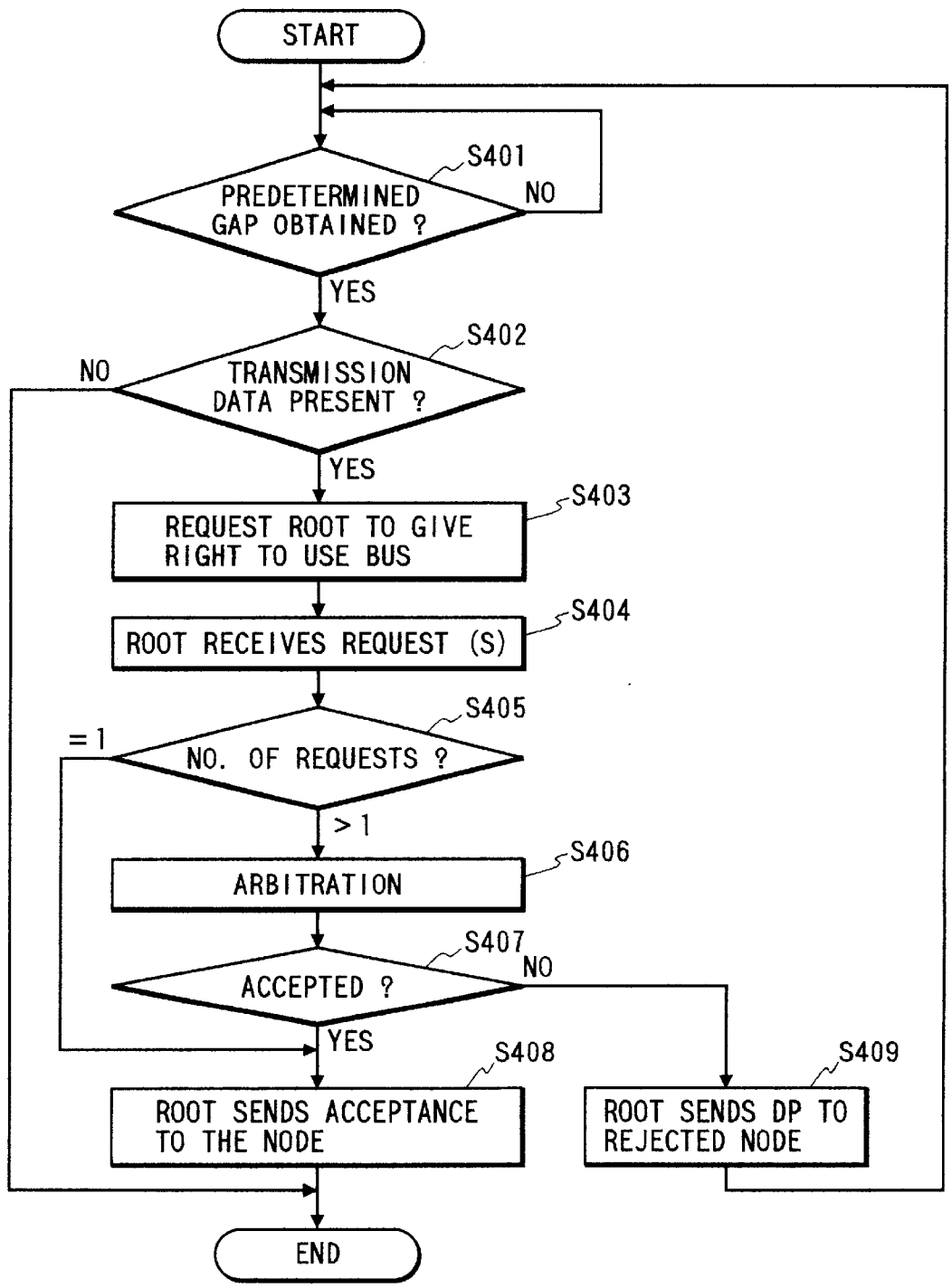
FIG. 22 is a flow chart illustrating an arbitration sequence of a serial bus according to the invention.

The above description has been directed to the arbitration sequence illustrated in the flow chart of FIG. 22.

Asynchronous Transmission

Figure 14:
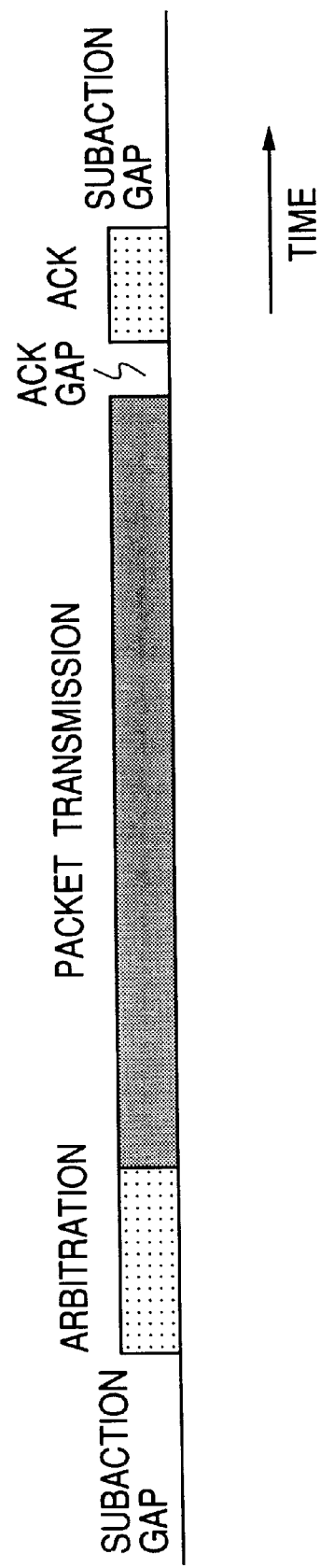
FIG. 14 is a diagram illustrating a transition state of asynchronous transmission according to the invention.

FIG. 14 illustrates a time sequential transition state during asynchronous transmission. The first subaction gap shown in FIG. 14 indicates a bus idle state. When this idle time takes a predetermined value, the node which desires data transmission judges that the bus may be used so that arbitration for bus acquisition is executed.

After the bus use permission is obtained through arbitration, data transmission is executed in the packet format. After the data transmission, the node received the transmitted data responds by returning back an ack (reception confirmation return code) or a response packet after a short gap called an ack gap, to complete the data transmission. The ack is constituted of 4-bit information and 4-bit checksums, and contains information about a success, busy state, or pending state, the ack-being returned immediately back to the transmission node.

Figure 15:
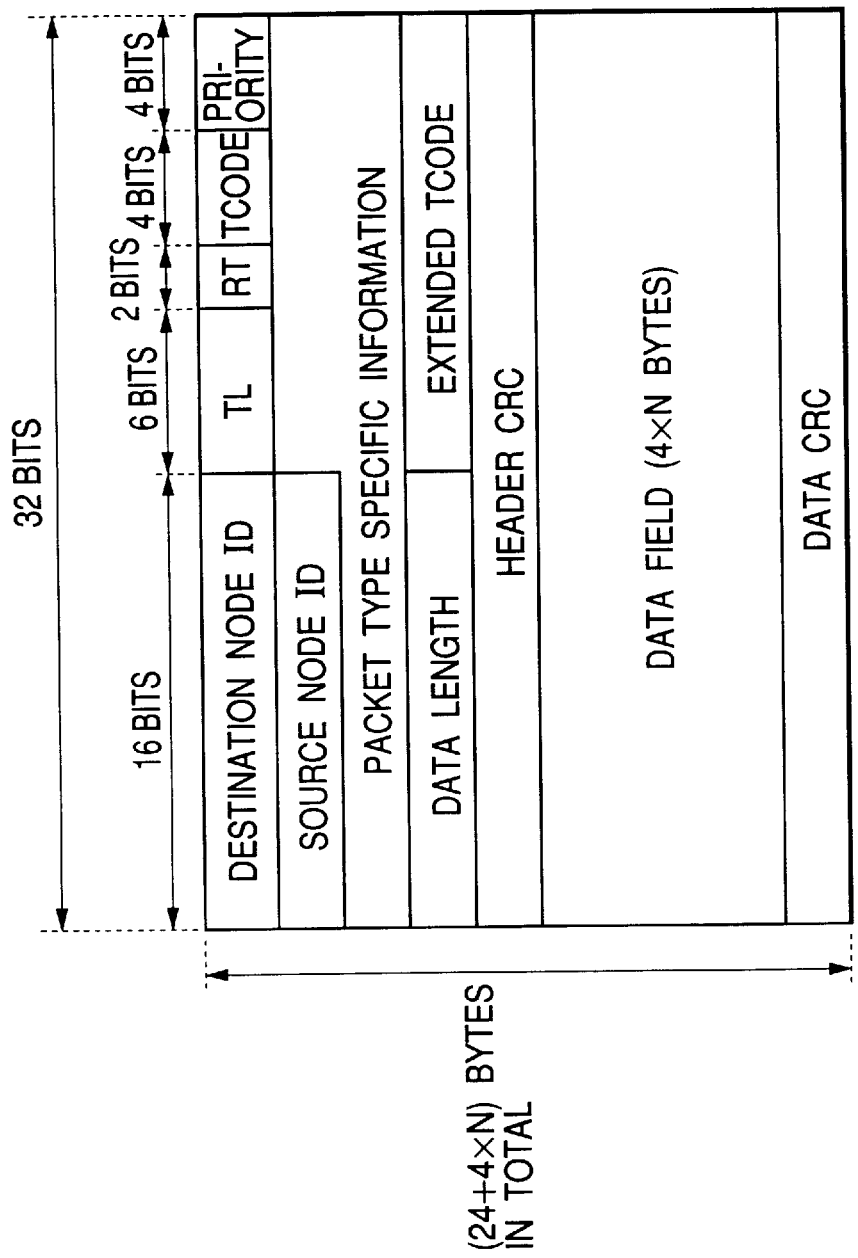
FIG. 15 is a diagram showing a packet format of asynchronous transmission according to the invention.

FIG. 15 shows an example of the packet format used by asynchronous transmission.

A packet is constituted of a data field, an error correcting data CRC field and a header field. As shown in FIG. 15, the header field is written with a destination node ID, a source node ID, a transmission data length, and various codes.

The asynchronous transmission is used for one-to-one communications from a source node to a destination node. A packet transmitted from the source node is distributed to each node in the network. However, the packet is neglected at each node unless it is directed to the destination node, so that only the destination node can read this packet.

The above description has been given for the asynchronous transmission.

Isochronous Transmission

The isochronous transmission which is the most distinctive feature of the 1394 serial bus is a transmission mode suitable for the transmission of data requiring real time transmission, such as multimedia data including video data and audio data.

Although the asynchronous transmission is one-to one transmission, the isochronous transmission is one-to-multi transmission in which data is transmitted from one source node to all other nodes by the broadcast function.

Figure 16:
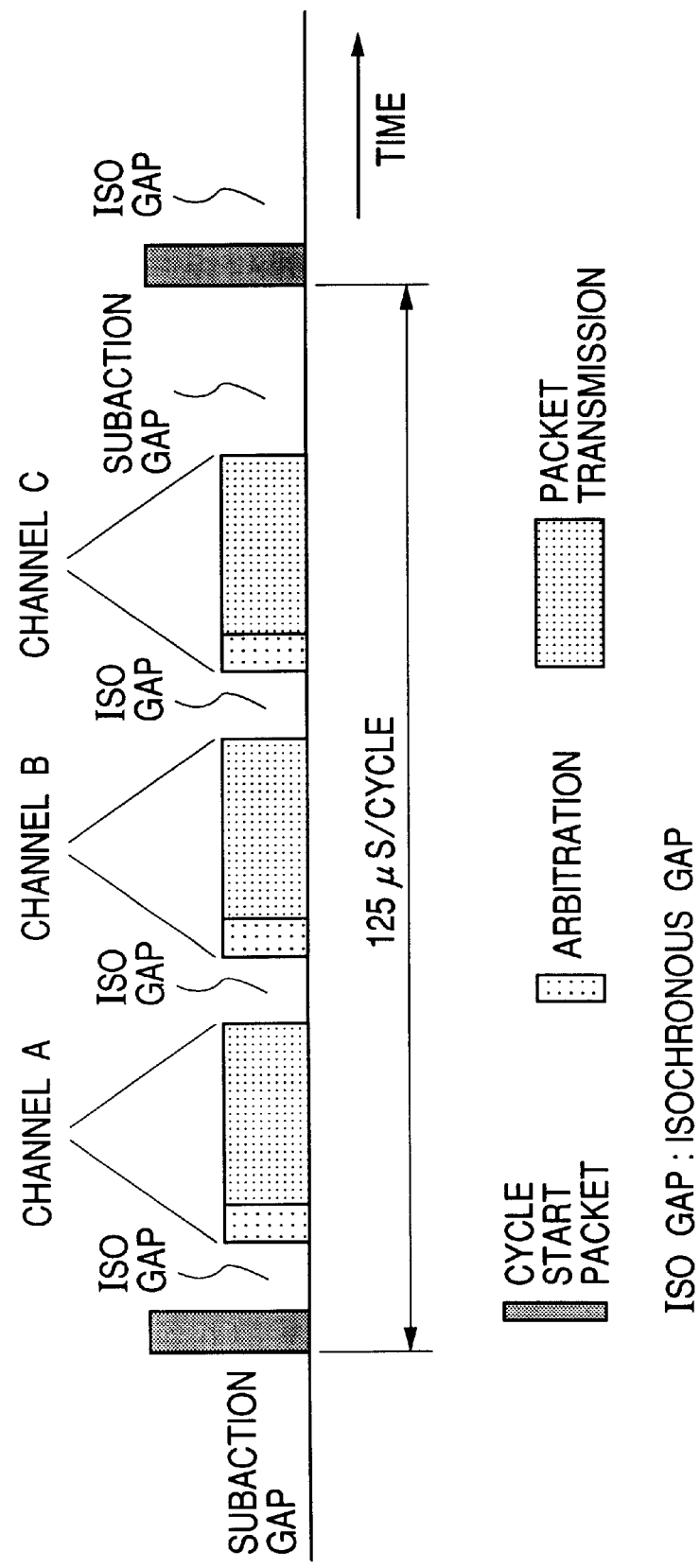
FIG. 16 is a diagram illustrating a transition state of isochronous transmission according to the invention.

FIG. 16 shows a time sequential transition state of isochronous transmission.

Isochronous transmission is carried out at a constant time interval on the bus. This time interval is called an isochronous cycle which is 125 $\mu$s. A cycle start packet indicates a start time of each cycle and has a role of adjusting time at each node. A node called a cycle master transmits this cycle start packet. This cycle start packet indicating the start of a main packet is transmitted after a lapse of a predetermined idle period (subaction gap) after transmission of one cycle before is completed. A time interval of transmitting the cycle start packets is 125 $\mu$s.

A plurality type of packets can be transmitted in a discriminated manner during each cycle, by giving each packet a specific channel ID as indicated by a channel A, a channel B and a channel C in FIG. 16. In this manner, real time transmissions between a plurality of nodes become possible. A node on the reception side receives only the data having a desired channel ID. This channel ID does not represent a destination address, but it only gives the data a logical number. Therefore, each packet transmitted from one node is broadcast to all other nodes.

Similar to the asynchronous transmission, arbitration is performed prior to isochronous transmission of a packet. However, since the isochronous transmission is not one-to-one communications like the asynchronous transmission, the isochronous transmission has no ack (reception confirmation return code).

An iso gap (isochronous gap) shown in FIG. 16 is an idle period which is required in order to confirm before isochronous transmission that the bus is idle. If this predetermined idle period lapses, a node which desires to perform isochronous transmission judges that the bus is idle, so that arbitration before transmission can be performed.

Figure 17:
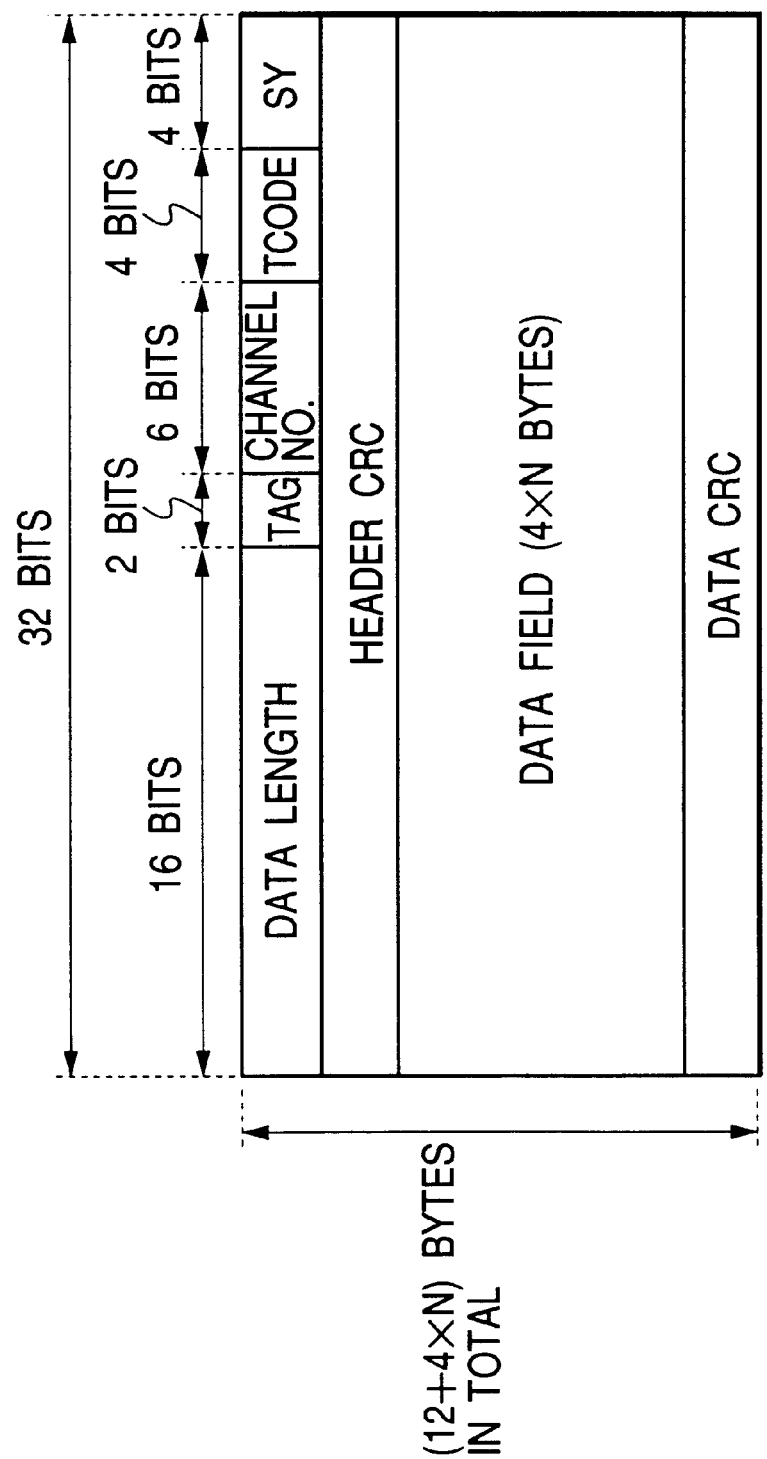
FIG. 17 is a diagram showing a packet format of isochronous transmission according to the invention.

Next, an example of the packet format of isochronous transmission shown in FIG. 17 will be described.

Each packet at a different channel has a data field, an error correction data CRC field and a header field. As shown in FIG. 17, the header field is written with a transmission data length, a channel number, various codes, an error correction header CRC, and the like.

The above description has been given for the isochronous transmission.

Bus Cycle

In practical transmission on the 1394 serial bus, both the isochronous transmission and asynchronous transmission are mixed. A time sequential transition of both the isochronous transmission and asynchronous transmission on the bus is illustrated in FIG. 18.

Isochronous transmission is performed with a priority over asynchronous transmission, because isochronous transmission can be set up with a gap length (isochronous gap) shorter than a gap length (subaction gap) for the idle period necessary for setting up asynchronous transmission. Because of this, the isochronous transmission is executed more preferentially than the asynchronous transmission.

Figure 18:
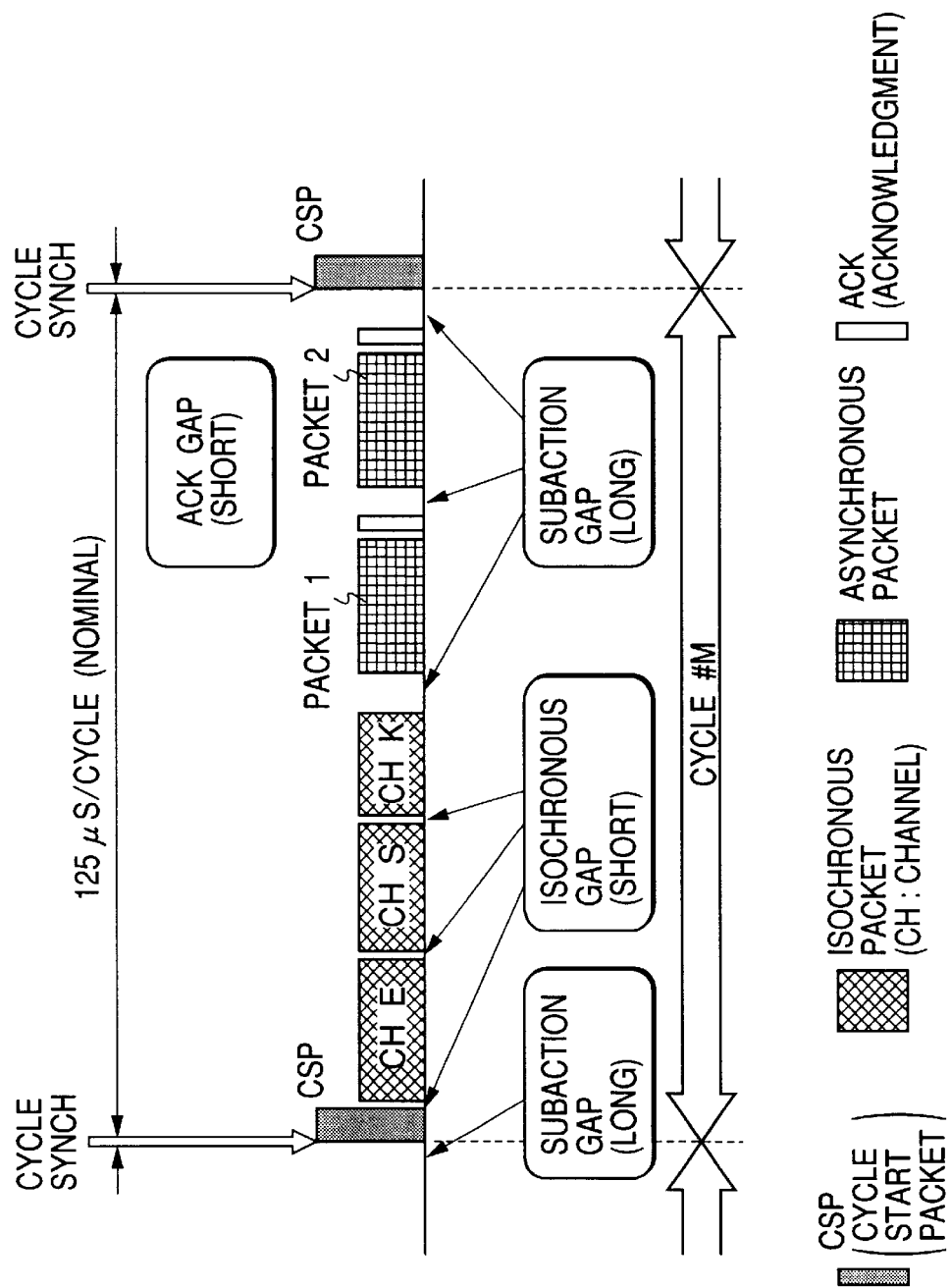
FIG. 18 is a diagram showing a transition state of mixed asynchronous and isochronous transmissions according to the invention.

In a general bus cycle shown in FIG. 18, at the start of a cycle #m, a cycle start packet is transmitted from the cycle master to each node. Time at each node is adjusted and after the predetermined idle period (isochronous gap), a node which desires to execute isochronous transmission performs arbitration followed by packet transmission. In the example shown in FIG. 18, isochronous transmission is sequentially executed at a channel e, a channel s and a channel k.

The above operations from arbitration to packet transmission are repeated the number of given channels. After all isochronous transmissions in the cycle #m are completed, asynchronous transmission is permitted.

When the idle time reaches the subaction gap after which asynchronous transmission is permitted, a node which desires asynchronous transmission judges that arbitration can be executed.

Asynchronous transmission can be executed during the period after the completion of isochronous transmission and before the next cycle start packet transmission time (cycle synch.), only if the subaction gap is obtained during this period.

In the cycle #m shown in FIG. 18, isochronous transmission of three channels and succeeding asynchronous transmission (inclusive of ack) of two packets (packet 1 and packet 2) are executed. After the asynchronous packet 2, it becomes the next cycle (m+1) start time (cycle synch.) so that the transmission in the cycle #m is terminated at this time.

If it becomes a time to transmit the next cycle start packet during isochronous or asynchronous transmission, transmission is not forcibly intercepted, but the next cycle start packet is transmitted after the idle time after the preceding transmission is completed. Namely, if one cycle continues longer than 125 $\mu$s, the next cycle is made correspondingly shorter than a standard 125 $\mu$s. The cycle can be shortened or prolonged from the standard 125 $\mu$s for isochronous transmission.

However, in order to maintain real time transmission, isochronous transmission is executed by all means if necessary during each cycle, whereas asynchronous transmission may be passed to the next or following cycle because of a shortened cycle time.

As described so far, according to the present invention, a user can easily deal with an error of an image input apparatus connected to the printer.

What is claimed is:

1. A printer connectable to a digital camera, said printer comprising:

a storage unit, arranged to store information on a digital camera error and information on a manual for the digital camera;

a first discrimination unit, arranged to discriminate whether an error code has been received from the digital camera;

a display unit, arranged to display a digital camera error indication, if said first discrimination unit discriminates that the error code has been received;

a second discrimination unit, arranged to discriminate whether a print instruction has been entered by a user while said display unit displays the digital camera error indication;

a search unit, arranged to search said storage unit for a message corresponding to the received error code, if said second discrimination unit discriminates that the print instruction has been entered;

a print unit, arranged to print the message corresponding to the error code searched by said search unit, and arranged to print the information on the manual in response to a camera-manual-print instruction entered by the user;

a third discrimination unit, arranged to discriminate whether an error release signal has been received from the digital camera, if said second discrimination unit discriminates that the print instruction has not been entered; and a release unit, arranged to release the digital camera error indication displayed by said display unit, if said third discrimination unit discriminates that the error release signal has been received.

2. A printer according to claim 1, wherein said printer is connected directly to the digital camera via an IEEE 1394 connection.

3. A printer according to claim 1, wherein said printer is an ink jet printer.

4. A printer according to claim 1, wherein the message corresponding to the error code includes an error description and an error countermeasure.

5. A print system including a digital camera and a printer connectable to each other, said system comprising:

a storage unit, arranged to store information on a digital camera error and information on a manual for the digital camera;

a first transmission unit, arranged to transmit an error code from the digital camera to the printer, if an error has occurred in the digital camera;

a second transmission unit, arranged to transmit an error release signal from the digital camera to the printer, if the error has been released;

a display unit, arranged to display a digital camera error indication at the printer in response to the error code transmitted by said first transmission unit;

a discrimination unit, arranged to discriminate whether a print instruction has been entered by a user while said display unit displays the digital camera error indication;

a search unit, arranged to search said storage unit for a message corresponding to the transmitted error code, if said discrimination unit discriminates that the print instruction has been entered;

a print unit, arranged to print the message corresponding to the error code searched by said search unit at the printer, and arranged to print the information on the manual in response to a camera-manual-print instruction entered by the user; and a release unit, arranged to release the digital camera error indication displayed by said display unit in response to the error release signal transmitted by said second transmission unit.

6. A print system according to claim 5, wherein the digital camera and the printer are connected directly to each other via an IEEE 1394 connection.

7. A print system according to claim 5, wherein the printer is an ink jet printer.

8. A print system according to claim 5, wherein the message corresponding to the error code includes an error description and an error countermeasure.

9. A method of operation of a printer connectable to a digital camera, the printer having a storage unit for storing information on a digital camera error and information on a manual for the digital camera, said method comprising:

a first discrimination step, of discriminating whether an error code has been received from the digital camera;

a display step, of displaying a digital camera error indication, if it is discriminated in said first discrimination step that the error code has been received;

a second discrimination step, of discriminating whether a print instruction has been entered by a user while the digital camera error indication is displayed in the display step;

a search step, of searching the storage unit for a message corresponding to the received error code, if it is discriminated in the second discrimination step that the print instruction has been entered;

a print step, of printing the message corresponding to the error code searched in the search step, and printing the information on the manual in response to a camera-manual-print instruction entered by the user;

a third discrimination step, of discriminating whether an error release signal has been received from the digital camera, if it is discriminated in said second discrimination step that the print instruction has not been entered; and a release step, of releasing the digital camera error indication displayed in said display step, if it is discriminated in said third discrimination step that the error release signal has been received.

10. A method according to claim 9, wherein the printer is connected directly to the digital camera via an IEEE 1394 connection.

11. A method according to claim 9, wherein the printer is an ink jet printer.

12. A method according to claim 9, wherein the message corresponding to the error code includes an error description and an error countermeasure.

13. A method of operation of a print system that includes a digital camera and a printer connectable to each other, the printer having a storage unit for storing information on a digital camera error and information on a manual for the digital camera, said method comprising:

a first transmission step, of transmitting an error code from the digital camera to the printer, if an error has occurred in the digital camera;

a second transmission step, of transmitting an error release signal from the digital camera to the printer, if the error has been released;

a display step, of displaying a digital camera error indication at the printer in response to the error code transmitted in the first transmission step;

a discrimination step, of discriminating whether a print instruction has been entered by a user while the digital camera error indication is displayed in the display step;

a search step, of searching the storage unit for a message corresponding to the transmitted error code, if it is discriminated in the discrimination step that the print instruction has been entered;

a print step, of printing the message corresponding to the error code searched in the search step at the printer, and printing the information on the manual in response to a camera-manual-print instruction entered by the user; and a release step, of releasing the digital camera error indication displayed in said display step in response to the error release signal transmitted in the second transmission step.

14. A method according to claim 13, wherein the digital camera and the printer are connected directly to each other via an IEEE 1394 connection.

15. A method according to claim 13, wherein the printer is an ink jet printer.

16. A method according to claim 13, wherein the message corresponding to the error code includes an error description and an error countermeasure.

17. A computer-readable memory medium storing a program for implementing a method of operation of a printer connectable to a digital camera, the printer having a storage unit for storing information on a digital camera error and information on a manual for the digital camera, the program comprising:

program code of a first discrimination step, of discriminating whether an error code has been received from the digital camera;

program code of a display step, of displaying a digital camera error indication, if it is discriminated in the first discrimination step that the error code has been received;

program code of a second discrimination step, of discriminating whether a print instruction has been entered by a user while the digital camera error indication is displayed in the display step;

program code of a search step, of searching the storage unit for a message corresponding to the received error code, if it is discriminated in the second discrimination step that the print instruction has been entered;

program code of a print step, of printing the message corresponding to the error code searched in the search step, and printing the information on the manual in response to a camera-manual-print instruction entered by the user;

program code of a third discrimination step, of discriminating whether an error release signal has been received from the digital camera, if it is discriminated in the second discrimination step that the print instruction has not been entered; and program code of a release step, of releasing the digital camera error indication displayed in the display step, if it is discriminated in the third discrimination step that the error release signal has been received.

18. A computer program product embodying a program for implementing a method of operation of a printer connectable to a digital camera, the printer having a storage unit for storing information on a digital camera error and information on a manual for the digital camera, the program comprising:

program code of a first discrimination step, of discriminating whether an error code has been received from the digital camera;

program code of a display step, of displaying a digital camera error indication, if it is discriminated in the first discrimination step that the error code has been received;

program code of a second discrimination step, of discriminating whether a print instruction has been entered by a user while the digital camera error indication is displayed in the display step;

program code of a search step, of searching for a message corresponding to the received error code, if it is discriminated in the second discrimination step that the print instruction has been entered;

program code of a print step, of printing the message corresponding to the error code searched in the search step, and printing the information on the manual in response to a camera-manual-print instruction entered by the user;

program code of a third discrimination step, of discriminating whether an error release signal has been received from the digital camera, if it is discriminated in the second discrimination step that the print instruction has not been entered; and program code of a release step, of releasing the digital camera error indication displayed in the display step, if it is discriminated in the third discrimination step that the error release signal has been received.

19. A printer connectable to a digital camera, said printer comprising:

a storage unit, arranged to store information on a digital camera error and information on a manual for the digital camera;

a first discrimination unit, arranged to discriminate whether an error code has been received from the digital camera;

a display unit, arranged to display a camera error indication, if said first discrimination unit discriminates that the error code has been received;

a second discrimination unit, arranged to discriminate whether a print instruction has been entered by a user while said display unit displays the digital camera error indication;

a search unit, arranged to search said storage unit for a message corresponding to the received error code, if said second discrimination unit discriminates that the print instruction has been entered; and a print unit, arranged to print the message corresponding to the error code searched by said search unit, and arranged to print the information on the manual in response to a camera-manual-print instruction entered by the user.

20. A print system including a digital camera and a print connectable to each other, said system comprising:

a storage unit, arranged to store information on a digital camera error and information on a manual for the digital camera;

a first transmission unit, arranged to transmit an error code from the digital camera to the printer, if an error has occurred in the digital camera;

a second transmission unit, arranged to transmit an error release signal from the digital camera to the printer, if the error has been released;

a display unit, arranged to display a digital camera error indication at the printer in response to the error code transmitted by said first transmission unit;

a discrimination unit, arranged to discriminate whether a print instruction has been entered by a user while said display unit displays the digital camera error indication;

a search unit, arranged to search said storage unit for a message corresponding to the transmitted error code, if said discrimination unit discriminates that the print instruction has been entered; and a print unit, arranged to print the message corresponding to the error code searched by said search unit at the printer, and arranged to print the information on the manual in response to a camera-manual-print instruction entered by the user.

* * * * *

UNITED STATES PATENT AND TRADEMARK OFFICE
CERTIFICATE OF CORRECTION

PATENT NO. : 6,806,975 B1
DATED : October 19, 2004
INVENTOR(S) : Miyuki Fujita et al.

It is certified that error appears in the above-identified patent and that said Letters Patent is hereby corrected as shown below:

Column 1,
Line 33, "easy" should read -- able --; and
Line 43, "real" should read -- user's --.

Column 6,
Line 17, "an" should be deleted.

Column 7,
Line 47, "IDs" should read -- IDs for --.

Column 9,
Line 4, "DS-Ling" should read -- DS-Link --.

Column 10,
Line 37, "not still" should read -- still not --.

Column 11,
Line 4, "ia" should read -- is --.

Column 15,
Line 4, "one-to one" should read -- one-to-one --.

Column 20,
Line 35, "print" (second occurrence) should read -- printer --.

Signed and Sealed this

First Day of February, 2005

JON W. DUDAS
*Director of the United States Patent and Trademark Office*